(12) United States Patent
Yamamoto et al.

(10) Patent No.: US 11,577,797 B2
(45) Date of Patent: Feb. 14, 2023

(54) UTILITY VEHICLE

(71) Applicant: KAWASAKI JUKOGYO KABUSHIKI KAISHA, Hyogo (JP)

(72) Inventors: Shunsuke Yamamoto, Kakogawa (JP); Kenta Takada, Kobe (JP)

(73) Assignee: KAWASAKI MOTORS, LTD., Hyogo (JP)

(*) Notice: Subject to any disclaimer, the term of this patent is extended or adjusted under 35 U.S.C. 154(b) by 252 days.

(21) Appl. No.: 17/167,341

(22) Filed: Feb. 4, 2021

(65) Prior Publication Data

US 2022/0242508 A1 Aug. 4, 2022

(51) Int. Cl.
| | | |
|---|---|---|
| *B62D 65/14* | (2006.01) | |
| *B60N 2/015* | (2006.01) | |
| *B60N 2/58* | (2006.01) | |
| *B62D 21/18* | (2006.01) | |
| *B62D 25/06* | (2006.01) | |
| *B60N 2/02* | (2006.01) | |

(52) U.S. Cl.
CPC .............. *B62D 65/14* (2013.01); *B60N 2/015* (2013.01); *B60N 2/02* (2013.01); *B60N 2/58* (2013.01); *B62D 21/183* (2013.01); *B62D 25/06* (2013.01); *B60Y 2200/20* (2013.01)

(58) Field of Classification Search
CPC ...... B62D 65/14; B62D 21/183; B62D 25/06; B60N 2/015; B60N 2/02; B60N 2/58; B60N 2/012; B60N 2/305; B60Y 2200/20
USPC ......................................... 296/65.01
See application file for complete search history.

(56) References Cited

U.S. PATENT DOCUMENTS

| | | | | |
|---|---|---|---|---|
| 7,147,075 | B2* | 12/2006 | Tanaka ................ | B60K 5/04 180/291 |
| 8,353,534 | B2* | 1/2013 | Arnold ............... | B60N 2/3013 280/808 |
| 9,988,116 | B2 | 6/2018 | Kirtland et al. | |
| 2018/0251173 | A1 | 9/2018 | Kirtland et al. | |
| 2021/0162898 | A1* | 6/2021 | McGraw .............. | B60N 2/10 |

* cited by examiner

*Primary Examiner* — Pinel E Romain
(74) *Attorney, Agent, or Firm* — Wenderoth, Lind & Ponack, L.L.P.

(57) ABSTRACT

A utility vehicle includes: a seat arranged in a vehicle interior; a seat mounting frame to which the seat is mounted; a vehicle body frame to which the seat mounting frame is mounted; and a seat cover that is arranged below the seat, and defines a lower side of the vehicle interior and covers the seat from below. The seat mounting frame and the vehicle body frame are arranged above and below the seat cover and are mounted so as to sandwich the seat cover. The seat of one of multiple seat types is mounted to the vehicle body frame via the seat mounting frame above the seat cover common to the multiple seat types.

17 Claims, 12 Drawing Sheets

UTILITY VEHICLE

BACKGROUND OF THE INVENTION

Field of the Invention

The present invention relates to a utility vehicle.

Description of Related Art

A utility vehicle is provided with a seat in which a driver and an occupant sit side by side in a vehicle interior. For example, US 2018/0,251,173 A discloses a utility vehicle in which a seat mounting frame is mounted to a vehicle body frame.

SUMMARY OF THE INVENTION

In the utility vehicle, a dedicated vehicle body frame is prepared for each of multiple seat types such as a separate seat type and a bench seat type. In this case, the number of types of vehicle body frames increases, which may cause a decrease in productivity.

Therefore, an object of the present invention is to provide a utility vehicle in which seats of multiple seat types can be mounted with high productivity.

In order to achieve the above object, according to the present invention, there is provided a utility vehicle including: a seat arranged in a vehicle interior; a seat mounting frame to which the seat is mounted; a vehicle body frame to which the seat mounting frame is mounted; and a seat cover that is arranged below the seat, and defines a lower side of the vehicle interior and covers the seat from below, in which the seat mounting frame and the vehicle body frame are arranged above and below the seat cover and mounted with the seat cover interposed therebetween, and in which the seat of one of multiple seat types is mounted to the vehicle body frame via the seat mounting frame above the seat cover common to the multiple seat types.

According to the present invention, the seat is mounted to the common vehicle body frame and seat cover via the seat mounting frame different for each seat. As a result, it is not necessary to assemble the vehicle body frame and the seat cover for each seat, and the productivity can be improved. In addition, the number of parts can be reduced by sharing the vehicle body frame and the seat cover. Therefore, the seats of the multiple seat types can be mounted with high productivity. Further, by preparing the seat mounting frame, it is possible to reduce through holes formed in the seat cover required for mounting the seat. By reducing the through holes in this way, it is possible to prevent foreign matter from entering the vehicle interior through the through holes.

In one aspect of the present invention, the seat of one of a bench seat type, a separate seat type, and a composite type in which a bench seat and a separate seat are combined is mounted to the vehicle body frame.

According to this aspect, the seat of the bench seat type, the separate seat type, or the composite type can be mounted to the vehicle body frame with high productivity while suppressing foreign matter from entering the vehicle interior from below the seat.

In one aspect of the present invention, the seat mounting frame for the bench seat type and the separate seat type or the seat mounting frame for the composite type is mounted to the vehicle body frame depending on the seat type of the seat.

According to this aspect, for the bench seat type seat and the separate seat type seat, a common first seat mounting frame is used. Further, for the composite type seat, a second seat mounting frame different from the first seat mounting frame is used. In this way, since the common seat mounting frame is used for the bench seat type and the separate seat type, the number of parts and assembly man-hours are reduced as compared to the case where the seat mounting frame dedicated to each seat type is used, so that the productivity can be improved.

In one aspect of the present invention, a floor panel that defines the lower side of the vehicle interior together with the seat cover is arranged on a front side of a vehicle body of the seat cover, the seat cover includes an upper surface portion that is arranged below the seat and extends in a front-rear direction, and a front surface portion that extends downward from a front side of the upper surface portion and is connected to the floor panel, and a recessed portion that is recessed downward from the upper surface portion and recessed rearward from the front surface portion is formed on one side of the seat cover in a vehicle width direction.

According to this aspect, since the recessed portion that is recessed downward from the upper surface portion and recessed rearward from the front surface portion is formed on one side of the seat cover in the vehicle width direction, a storage space for storing luggage or the like can be formed by the recessed portion in the lower part of the seat on one side in the vehicle width direction.

In one aspect of the present invention, the seat includes a first seat for an occupant excluding a driver, which is arranged on one side in a vehicle width direction, and a second seat for a driver, which is arranged on the other side in the vehicle width direction, and the first seat is configured so that a seat portion can be arranged in a seating position and a flip-up position.

According to this aspect, when the seat including the first seat for an assistant and the second seat for a driver is mounted, the first seat can be arranged in the flip-up position when the occupant is not seated on the first seat to provide a storage space.

In one aspect of the present invention, a floor panel that defines the lower side of the vehicle interior together with the seat cover is arranged on a front side of a vehicle body of the seat cover, the seat cover includes an upper surface portion that is arranged below the seat and extends in a front-rear direction, and a front surface portion that extends downward from a front side of the upper surface portion and is connected to the floor panel, and a recessed portion that is recessed downward from the upper surface portion and recessed rearward from the front surface portion is formed in a lower part of the first seat in the seat cover.

According to this aspect, the first seat can be arranged in the flip-up position to open the upper part of the recessed portion formed in the seat cover, and the storage space can be increased. In addition, the recessed portion provided below the first seat can be accessed from above, making it easier to load and unload an object housed in the recessed portion.

In one aspect of the present invention, the seat cover is made of resin.

According to this aspect, the seat cover can be formed with better moldability and reduced in weight as compared with the case where the seat cover is made of metal.

In one aspect of the present invention, the recessed portion includes an outer wall portion on an outer side in the vehicle width direction which forms the recessed portion, and an inner wall portion on an inner side in the vehicle width direction which forms the recessed portion, and a front end portion of the outer wall portion is located behind a front end portion of the inner wall portion.

According to this aspect, as compared with the case where the front end portion of the outer wall portion of the recessed portion is not located behind the front end portion of the inner wall portion of the recessed portion, access to the recessed portion forming the storage space from the door side arranged outside the vehicle interior in the vehicle width direction can be made easier.

In one aspect of the present invention, a support portion that supports the seat from below is stretched over the outer wall portion and the inner wall portion of the recessed portion so as to extend in the vehicle width direction.

According to this aspect, since the support portion that supports the seat from below is stretched over the outer wall portion and the inner wall portion of the recessed portion so as to extend in the vehicle width direction, even when the recessed portion is formed in the seat cover, the load acting on the seat arranged above the recessed portion can be transmitted to the outer wall portion and the inner wall portion of the recessed portion by the support portion.

In one aspect of the present invention, the support portion constitutes a part of the seat mounting frame.

According to this aspect, since the support portion that supports the seat from below constitutes a part of the seat mounting frame, the load acting on the seat arranged above the recessed portion can be transmitted from the seat mounting frame to the vehicle body frame.

In one aspect of the present invention, the seat mounting frame is removably mounted to the vehicle body frame.

According to this aspect, even after the utility vehicle is manufactured, the seat mounting frame can be replaced according to the user's preference, and the seats with different seat types can be mounted. The seat arrangement can be changed after purchase of the utility vehicle.

In one aspect of the present invention, the seat includes a seat inner frame that is arranged inside the seat to form a skeleton of the seat, and the seat inner frame is supported by the seat mounting frame.

According to this aspect, since the load acting on the seat is transmitted from the seat inner frame to the vehicle body frame through the seat mounting frame, even when the seat type of the seat is different, the load from the seat mounting frame can be transmitted to the vehicle body frame while the variation in the state of transmission of the load to the vehicle body frame which is input from the seat mounting frame is suppressed. The seat can be mounted to the seat mounting frame so that the mounting position differs for each seat according to the mounting position and mounting structure of the seat inner frame, whereas the seat mounting frame can be mounted to the vehicle body frame with the mounting position kept constant even when the seat is different. As a result, even when the seat, specifically the seat inner frame is different, the load can be transmitted from the seat mounting frame to the vehicle body frame while the variation in the transmission of the load transmitted from the seat mounting frame to the vehicle body frame is suppressed. As a result, it is not necessary to set design conditions different for each seat type for the vehicle body frame.

In one aspect of the present invention, the seat cover is formed with a through hole through which a connecting portion for connecting the seat mounting frame and the vehicle body frame penetrates, and the seat cover is interposed in a portion between the seat mounting frame and the vehicle body frame excluding the connecting portion.

According to this aspect, even when the seat mounting frame and the vehicle body frame are mounted with the seat cover interposed therebetween, the seat cover is interposed in the portion between the seat mounting frame and the vehicle body frame excluding the connecting portion, so that it is possible to suppress the inflow and outflow of air between the inside of the vehicle interior and the lower part of the seat cover.

In one aspect of the present invention, the utility vehicle further includes a roof cover that covers an upper side of the vehicle interior.

According to this aspect, since the roof cover that covers the upper side of the vehicle interior is provided, the occupant in the vehicle interior can be protected from water and fine particles falling from above such as rainfall and falling sand.

In one aspect of the present invention, the utility vehicle further includes an air conditioner.

According to this aspect, air conditioning in the vehicle interior can be performed, and comfort in the vehicle interior can be improved. By reducing the through holes formed in the seat cover, it is possible to prevent the outside air from entering the vehicle interior and the inside air from exiting to the outside of the vehicle interior, thereby enhancing the air conditioning effect.

DETAILED DESCRIPTION OF THE PREFERRED EMBODIMENT

Hereinafter, a utility vehicle according to an embodiment of the present invention will be described with reference to the accompanying drawings. The utility vehicle is mainly a vehicle for traveling not only on grasslands, gravel, and sand, but also on an off road such as unpaved mountain roads, forest roads, muddy areas, and rocky areas. In the present specification, "front", "rear", "left", and "right" refer to a front direction, a rear direction, a left direction, and a right direction as seen from a driver in the utility vehicle.

Figure 1:
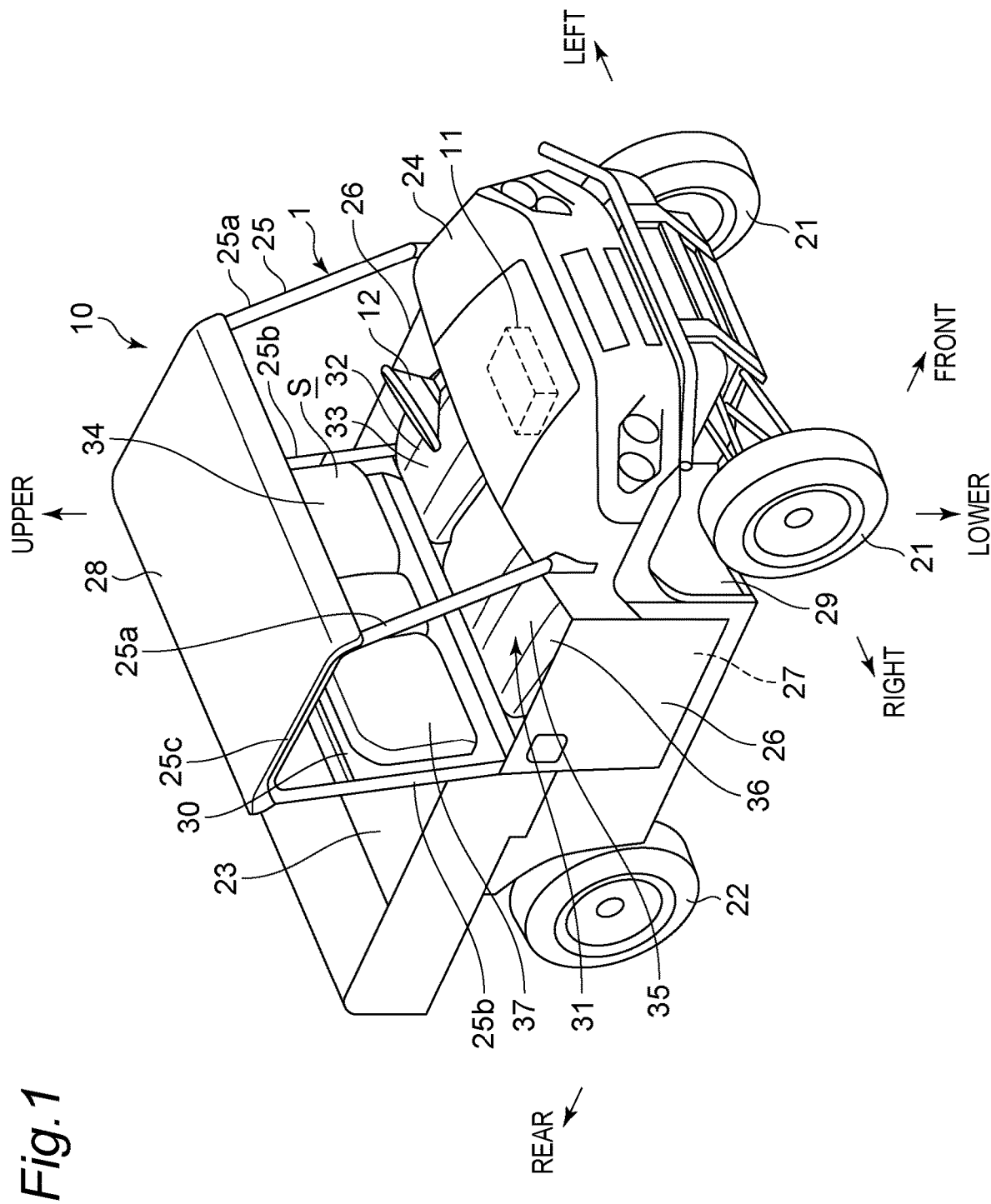
FIG. 1 is a perspective view of a utility vehicle according to an embodiment of the present invention.

FIG. 1 is a perspective view of the utility vehicle according to the embodiment of the present invention. As shown in FIG. 1, a utility vehicle 10 includes a pair of left and right front wheels 21 at the front of a vehicle body and a pair of left and right rear wheels 22 at the rear of the vehicle body, and has a riding space (vehicle interior) S on which a driver and an occupant who is on the vehicle excluding the driver ride between the front wheels 21 and the rear wheels 22. A loading platform 23 is provided behind the riding space S, and a bonnet 24 is provided in front of the riding space S.

The riding space S is surrounded by a ROPS 25, a pair of left and right doors 26, a floor panel 27 (see FIG. 4), a roof cover 28, a front panel 29, and a back panel 30. The ROPS 25 is an abbreviation for rollover protection structure and is a part of a vehicle body frame 1.

The ROPS 25 includes a pair of left and right front vertical frames 25a extending in the up-down direction on the front side of the vehicle body, a pair of left and right rear vertical frames 25b extending in the up-down direction on the rear side of the vehicle body, and a pair of left and right roof frames 25c extending in the vehicle front-rear direction and connecting upper end portions of the front vertical frames 25a and upper end portions of the rear vertical frames 25b, respectively.

The left and right doors 26 cover the right side of the vehicle body and the left side of the vehicle body of the riding space S, the floor panel 27 covers the lower side of the riding space S, the roof cover 28 covers the upper side of the riding space S, the front panel 29 covers the front side of the riding space S, and the back panel 30 covers the rear side of the riding space S.

Although not shown, the riding space S is surrounded by door windows arranged above the left and right doors 26, a front window arranged above the front panel 29, and a back window arranged above the back panel 30, so that the riding space S is blocked in the left-right direction, the front-rear direction, and the up-down direction. The riding space S is sealed by blocking rainwater, wind, dust, etc. from the outside. The utility vehicle 10 includes an air conditioner 11 that heats, cools, ventilates, and air-conditions the riding space S.

The left and right doors 26 and the door windows define the right side and the left side of the riding space S, the floor panel 27 defines the lower side of the riding space S, the roof cover 28 defines the upper side of the riding space S, the front panel 29 and the front window define the upper side of the riding space S, and the back panel 30 and the back window define the rear side of the riding space S. The utility vehicle 10 is configured to have a partition wall that prevents outside air from entering during traveling by separating the indoor space, which is the riding space S, from the outdoor space.

In the utility vehicle 10, a composite type seat 31 that combines a bench seat and a separate seat is installed in the riding space S. As the composite type seat 31, a separate seat (second seat) 32 for a driver, which is arranged on the left side of the vehicle body, and a bench seat (first seat) 35 for an occupant excluding the driver, which is arranged on the right side of the vehicle body, are arranged side by side in the vehicle width direction. An operation unit 12 such as a steering wheel is provided on the front side of the separate seat 32.

The separate seat 32 is a seat that can be seated by one person, and includes a seat cushion 33 which is a seat portion having an area that can be seated by one person, and a seat back 34 which is a backrest portion. Further, the separate seat 32 is configured such that the seat cushion 33 can be moved in the front-rear direction according to the physique and preference of the seated person. The separate seat 32 is formed so that the central side of the seat in the vehicle width direction is recessed downward and is separated from the adjacent seat. A bucket seat may be used as a kind of separate seat 32. The bucket seat is configured such that the seat back and the seat cushion are integrally formed, and the occupant is wrapped from both sides so as to enhance the lateral holding property of the occupant.

The bench seat 35 is a seat that can be seated by one or more people, and includes a seat cushion 36 that extends to the left and right of the vehicle body to form a single seat portion for multiple people, and a seat back 37 which is a backrest portion. The bench seat 35 has a smaller downward depression than the separate seat 32, and is formed laterally long. The bench seat 35 is a bench seat excluding the driver seat.

In the utility vehicle 10, instead of the composite type seat 31, a bench seat type seat or a separate seat type seat, which will be described later, can be mounted. In the utility vehicle 10, the seat of one of the multiple seat types of the bench seat type, the separate seat type, and the composite type is mounted to the common vehicle body frame 1 above a seat cover common to the multiple seat types via a seat mounting frame.

Figure 2:
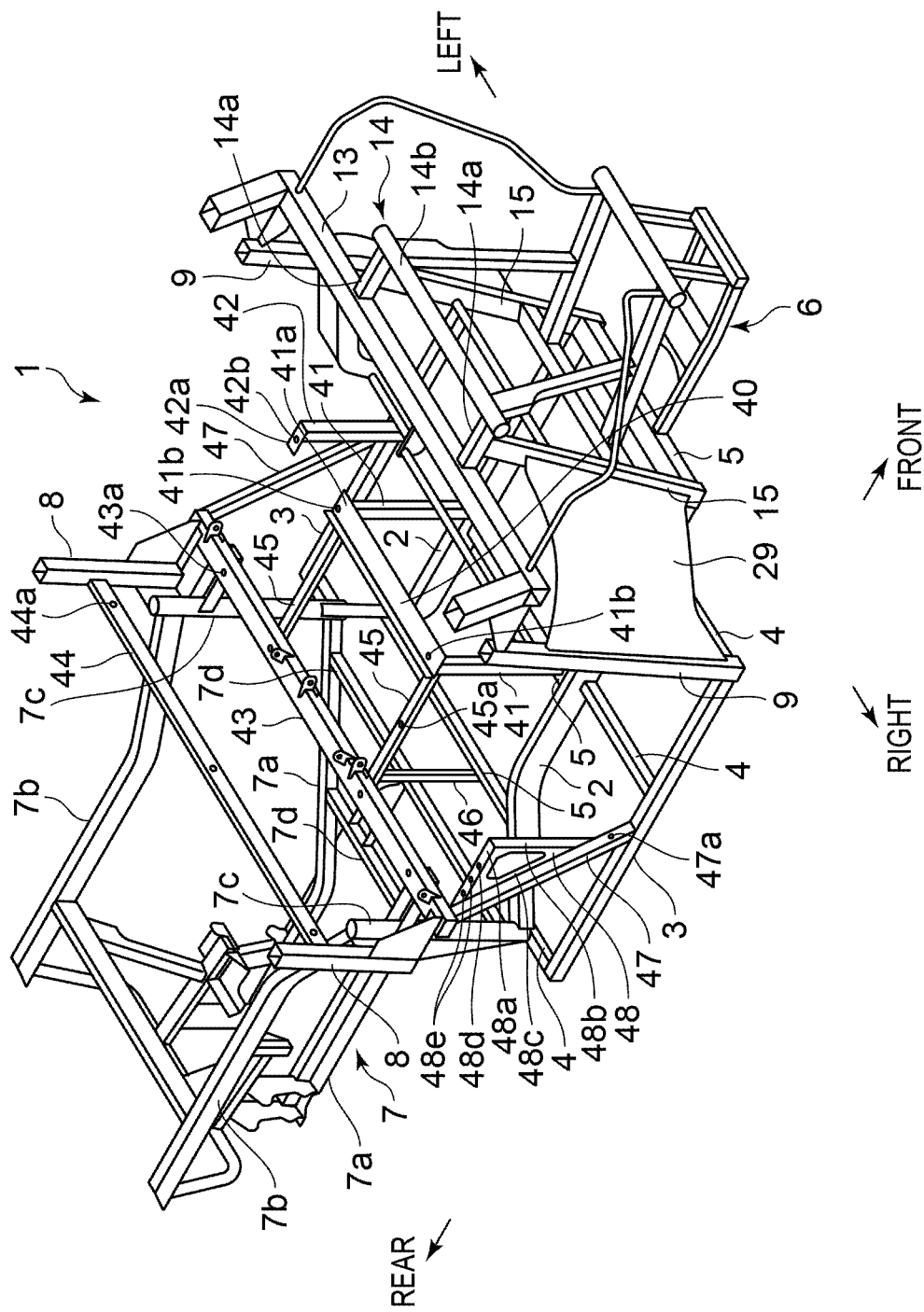
FIG. 2 is a perspective view of a vehicle body frame of the utility vehicle.

FIG. 2 is a perspective view of the vehicle body frame 1 of the utility vehicle 10. FIG. 2 also shows a part of the front panel 29. As shown in FIG. 2, in the utility vehicle 10, the vehicle body frame 1 common to the multiple seat types is assembled. The vehicle body frame 1 includes a pair of left and right main frames 2 extending in the front-rear direction in a substantially horizontal direction, and a pair of left and right side frames 3 arranged outside the left and right main frames 2 in the vehicle width direction and extending in the front-rear direction in the substantially horizontal direction.

The main frames 2 extend linearly on the front side and curves outward in the vehicle width direction on the rear side toward the rear. The side frames 3 extend linearly in the front-rear direction. The main frames 2 and the side frames 3 support the floor panel 27.

The left and right main frames 2 and the left and right side frames 3 are connected by side cross frames 4 extending linearly in the vehicle width direction in the substantially horizontal direction on the front side, the central side, and the rear side in the front-rear direction, respectively. The left and right main frames 2 are connected by center cross frames 5 extending linearly in the vehicle width direction in the substantially horizontal direction on the front side, the central side, and the rear side in the front-rear direction.

A front frame 6 is provided on the front side of the center cross frame 5 that connects the front sides of the left and right main frames 2. The front frame 6 supports a front wheel differential device and the like.

Rear frames 7 are provided at the rear end portions of the left and right main frames 2. The rear frame 7 includes a pair of left and right lower rear frames 7a extending rearward from the rear end portions of the left and right main frames 2, a pair of left and right upper rear frames 7b arranged above the left and right lower rear frames 7a, and connecting frames 7c that connect the front end portions of the lower rear frames 7a and the front end portions of the upper rear frames 7b and extend in the up-down direction.

The left and right lower rear frames 7a are connected by a plurality of lower cross frames 7d extending linearly in the vehicle width direction in the substantially horizontal direction. The lower rear frames 7a and the lower cross frames 7d support an engine, a rear wheel differential device, and the like. The left and right upper rear frames 7b support the loading platform 23.

Rear ROPS support frames 8 that extend upward in a substantially vertical direction and support the ROPS 25 are connected to the front end portions of the left and right upper rear frames 7b, respectively. The lower end portions of the rear vertical frames 25b of the ROPS 25 are connected to the rear ROPS support frames 8, respectively. The left and right rear ROPS support frames 8 support the back panel 30.

Door frames 9 that extend upward in the substantially vertical direction are connected to the front end portions of the left and right side frames 3, respectively. A front ROPS support frame 13 that extends linearly in the vehicle width direction in the substantially horizontal direction and supports the ROPS 25 is connected to the upper end portions of the left and right door frames 9. The lower end portions of the front vertical frames 25a of the ROPS 25 are connected to both sides of the front ROPS support frame 13 in the vehicle width direction.

A front subframe 14 is provided on the front side of the front ROPS support frame 13. The front subframe 14 includes a pair of left and right side subframes 14a extending forward from the front ROPS support frame 13 and a cross subframe 14b that connects the front end portions of the left and right side subframes 14a and extends in the vehicle width direction. Center vertical frames 15 that extend downward substantially linearly are connected to the left and right side subframes 14a, and the main frames 2 and the center cross frame 5 are connected to the lower end portions of the left and right center vertical frames 15, respectively.

In the utility vehicle 10, the front panel 29 is mounted to and supported by the left and right door frames 9 and the left and right center vertical frames 15. The front panel 29 extends in the vehicle width direction between the left and right door frames 9, and extends in the up-down direction between the front ROPS support frame 13, the center cross frame 5, and the side cross frame 4.

Although not shown, a dashboard extending in the vehicle width direction is arranged on the rear side of the front panel 29, and the dashboard is equipped with the operation unit 12 such as a steering wheel and instruments such as a speedometer and further equipped with the air conditioner 11 (see FIG. 1).

The vehicle body frame 1 includes a seat support frame 40 that supports the seat 31. The seat support frame 40 includes a pair of left and right first vertical frames 41 that extend upward in the substantially vertical direction from the central sides of the left and right main frames 2 in the front-rear direction, and a second vertical frame 42 extending upward in the substantially vertical direction from the side cross frame 4 on the left side of the vehicle body. The first vertical frames 41 and the second vertical frame 42 extend upward to substantially the same height and arranged at positions that overlap in the front-rear direction.

Mounting brackets 41a, which are formed in a substantially flat plate shape and extend linearly in the vehicle width direction in the substantially horizontal direction, are fixed to the upper end portions of the left and right first vertical frames 41. Through holes 41b are formed in the mounting brackets 41a on both sides in the vehicle width direction, respectively, and nuts are welded to the lower surfaces of the mounting brackets 41a corresponding to the through holes 41b. The first vertical frame 41 on the left side is arranged below the separate seat 32 for a driver (see FIG. 1), and the first vertical frame 41 on the right side is arranged at a position farther from the separate seat 32 to the assistant driver seat side and is arranged on the right side of a recessed portion 54 (see FIG. 5) of a seat cover 50, which will be described later, and below the bench seat 35 (see FIG. 1).

A mounting bracket 42a formed in a substantially flat plate shape is fixed to the upper end portion of the second vertical frame 42. A through hole 42b is formed in the mounting bracket 42a, and a nut is welded to the lower surface of the mounting bracket 42a corresponding to the through hole 42b.

The seat support frame 40 includes a first cross frame 43 that is connected to the left and right connecting frames 7c behind the mounting brackets 41a and extends in the vehicle width direction in the substantially horizontal direction, and a second cross frame 44 that is connected to the left and right rear ROPS support frames 8 behind and above the first cross frame 43 and extends in the vehicle width direction in the substantially horizontal direction.

The seat support frame 40 further includes a pair of left and right main support frames 45, which are connected to the upper end portions of the left and right first vertical frames 41 and the first cross frame 43, respectively, and extend linearly in the front-rear direction in the substantially horizontal direction, and a third vertical frame 46 that extends upward in the substantially vertical direction from the center cross frame 5 arranged on the rear side and is connected to the main support frame 45 on the right side of the vehicle body. The seat support frame 40 is formed in a square frame shape by the left and right main support frames 45, the first cross frame 43, and the mounting bracket 41a.

The main support frame 45 on the right side of the vehicle body has a through hole 45a formed in the central side in the front-rear direction, and a nut is welded to the lower surface of the main support frame 45 corresponding to the through hole 45a. The first cross frame 43 is formed with a plurality of, specifically four screw holes 43a spaced apart from each other in the vehicle width direction. The second cross frame 44 is formed with a plurality of, specifically three through holes 44a spaced apart from each other in the vehicle width direction.

Both end portions of the first cross frame 43 in the vehicle width direction are connected to left and right inclined frames 47 extending so as to be inclined downward toward the front side. The left and right inclined frames 47 are connected to the side frames 3 on the rear side in the front-rear direction with respect to the first vertical frames 41 and the second vertical frame 42. Screw holes 47a are formed on the front sides of the left and right inclined frames 47, respectively.

A triangular frame 48 formed in a substantially right-angled triangular shape when viewed from the vehicle width direction is connected to the inclined frame 47 on the right side of the vehicle body. The triangular frame 48 includes an upper surface portion 48a extending in the substantially horizontal direction, a front surface portion 48b extending in the substantially vertical direction, and an inclined portion 48c extending so as to be inclined from the rear side of the upper surface portion 48a to the lower side of the front surface portion 48b.

The triangular frame 48 is formed so that the upper surface portion 48a has substantially the same height as the main support frame 45 and the front surface portion 48b is located on the rear side in the front-rear direction with respect to the first vertical frame 41. A through hole 48d is formed in the upper surface portion 48a of the triangular frame 48, and a nut is welded to the lower surface of the upper surface portion 48a corresponding to the through hole 48d. Screw holes 48e are formed in the upper surface portion 48a of the triangular frame 48 on the rear side of the through hole 48d.

The seat 31 arranged in the vehicle interior S, which is the riding space S, is mounted to the vehicle body frame 1 via a seat mounting frame 60 (described later) to which the seat 31 is mounted and the seat cover 50 (described later) that is arranged below the seat 31 and the seat mounting frame and covers the seat 31 from below.

Figure 3:
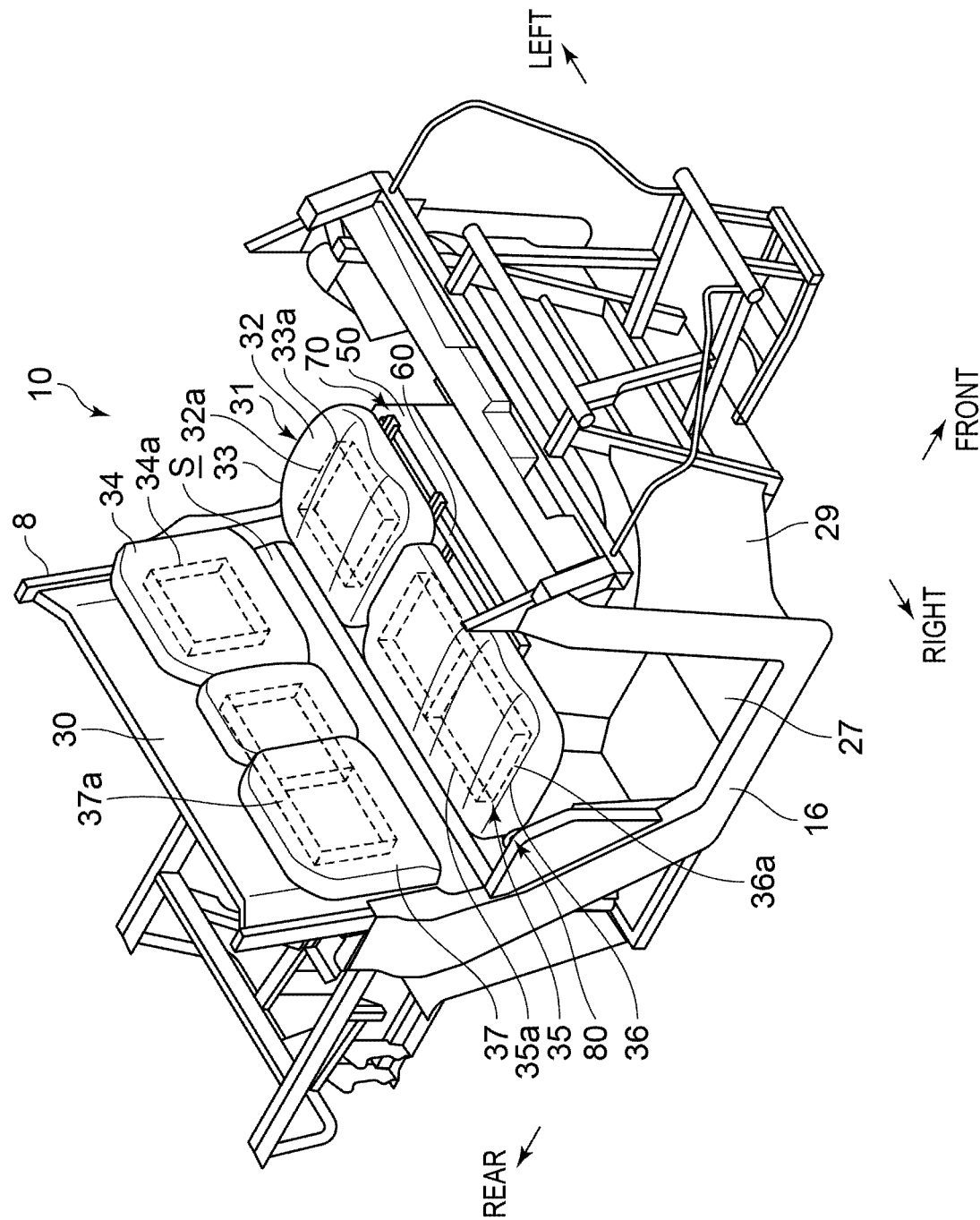
FIG. 3 is a perspective view of a vehicle interior provided with a composite type seat.

FIG. 3 is a perspective view of the vehicle interior provided with the composite type seat. FIG. 3 also shows a part of a side panel arranged around a door opening portion on the right side of the vehicle body. As shown in FIG. 3, in the composite type seat 31, the separate seat 32 and the bench seat 35 are arranged side by side in the vehicle width direction, the seat cushions 33 and 36 are arranged side by side in the vehicle width direction, and the seat backs 34 and 37 are arranged side by side in the vehicle width direction.

Inside the separate seat 32, a seat inner frame 32a forming the skeleton of the separate seat 32 is arranged. As the seat inner frame 32a, a seat cushion frame 33a is arranged inside the seat cushion 33, and a seat back frame 34a is arranged inside the seat back 34.

Inside the bench seat 35, a seat inner frame 35a forming the skeleton of the bench seat 35 is arranged. As the seat inner frame 35a, a seat cushion frame 36a is arranged inside the seat cushion 36, and a seat back frame 37a is arranged inside the seat back 37.

The seat back 34 of the separate seat 32 and the seat back 37 of the bench seat 35 are removably mounted to the second cross frame 44 (see FIG. 2) with the back panel 30 interposed therebetween by mounting fastening bolts as connecting portions to mounting brackets fixed to the seat back frames 34a and 37a through through holes 30c (see FIG. 5) of the back panel 30 and the through holes 44a of the second cross frame 44, respectively.

The seat cushion 33 of the separate seat 32 is mounted to the seat mounting frame 60 arranged above the seat cover 50 that covers the lower part of the seat 31 via a slide mechanism 70. The slide mechanism 70 is configured to move the seat cushion 33 of the separate seat 32 in the front-rear direction. The seat back 34 of the separate seat 32 may be moved back and forth in conjunction with the seat cushion 33.

The seat cushion 36 of the bench seat 35 is mounted to the seat mounting frame 60 via a flip-up mechanism 80. The flip-up mechanism 80 is configured to move the seat cushion 36 of the bench seat 35 between a seating position and a flip-up position, which will be described later.

Figure 4:
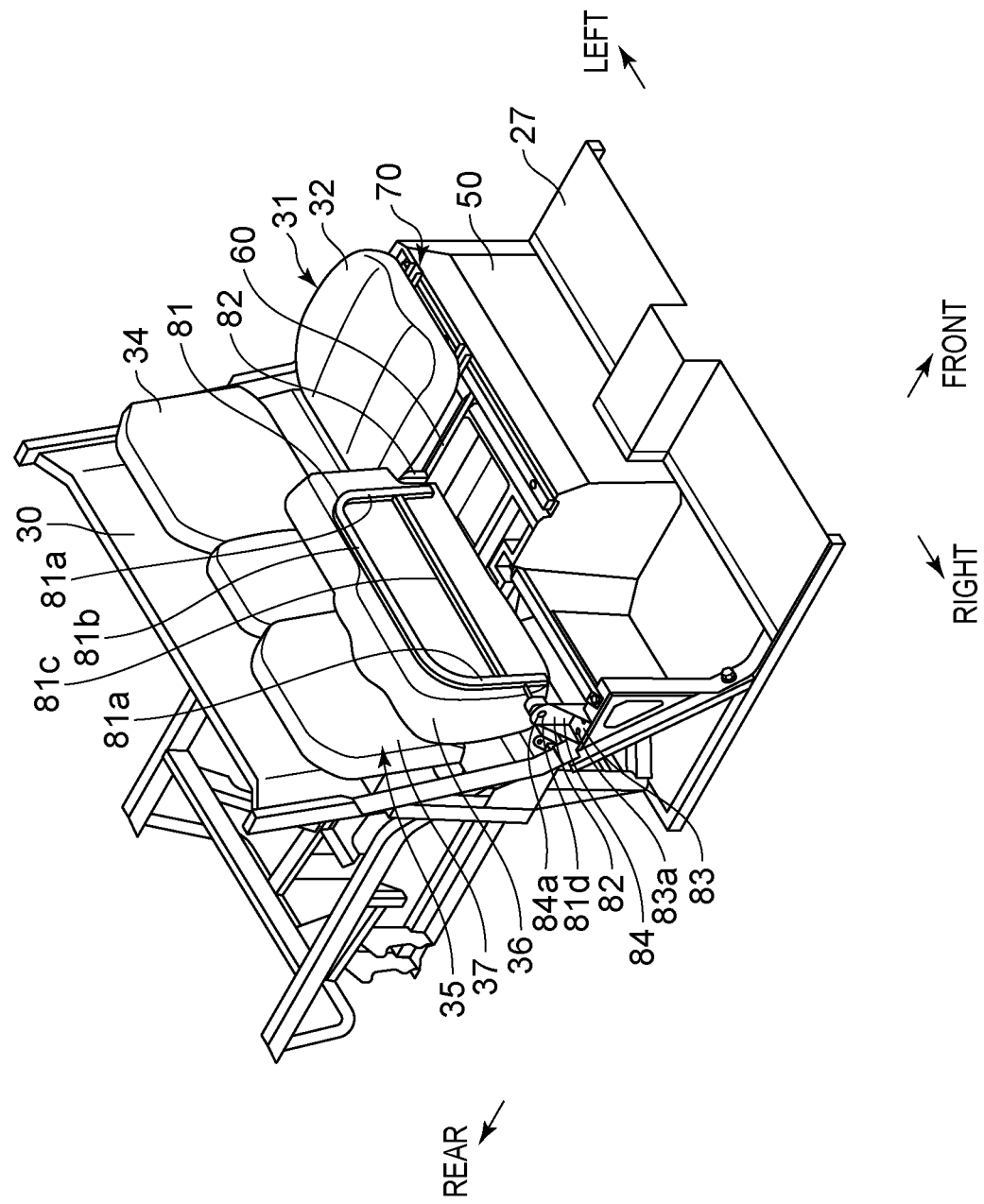
FIG. 4 is a perspective view of the vehicle interior in which a bench seat is arranged in a flip-up position.

FIG. 4 is a perspective view of the vehicle interior in which the bench seat is arranged in the flip-up position. As shown in FIG. 4, the flip-up mechanism 80 includes a base frame 81 that supports the seat cushion 36 and support brackets 82 that are arranged on both sides of the base frame 81 in the vehicle width direction and rotatably support the base frame 81.

The base frame 81 includes side portions 81a on both sides extending in a direction substantially orthogonal to the vehicle width direction, a connecting portion 81b that connects one end portions of the side portions 81a on both sides and extends in the vehicle width direction, and a reinforcing portion 81c that connects the central portions of the side portions 81a on both sides and extends in the vehicle width direction. Pin portions 81d protruding outward in the vehicle width direction are formed at the other end portions of the side portions 81a on both sides, respectively. The seat cushion frame 36a is fixedly mounted to the base frame 81.

The support brackets 82 each include a bottom surface portion 83 that supports the seat 31 from below and extends in a direction orthogonal to the up-down direction, and a side surface portion 84 extending upward from the bottom surface portion 83. Through holes 83a penetrating in the up-down direction are formed in the bottom surface portion 83 of the support bracket 82, and a pin hole 84a penetrating in the vehicle width direction is formed in the side surface portion 84 of the support bracket 82.

The support bracket 82 on the left side of the vehicle body is removably mounted to the seat mounting frame 60 by mounting fastening bolts as connecting portions to screw holes (described later) of the seat mounting frame 60 through the through holes 83a of the bottom surface portion 83. The screw holes of the seat mounting frame 60 are provided corresponding to the through holes 83a of the support bracket 82.

The support bracket 82 on the right side of the vehicle body is removably mounted to the vehicle body frame 1 with the seat cover 50 interposed therebetween by mounting fastening bolts as connecting portions for connecting the support bracket 82 and the vehicle body frame 1 through the through holes 83a of the bottom surface portion 83 to the screw holes 48e (see FIG. 2) of the upper surface portion 48a of the triangular frame 48 through through holes 55f (see FIG. 5) of the seat cover 50. The through holes 55f of the seat cover 50 and the screw holes 48e of the triangular frame 48 are provided corresponding to the through holes 83a of the support bracket 82. In FIG. 4, the fastening bolt connecting the support bracket 82 and the vehicle body frame 1 is removed.

The base frame 81 is rotatably supported by the support brackets 82 by being supported in such a manner that the pin portions 81d provided on the side portions 81a on both sides are inserted into the pin holes 84a of the support brackets 82 arranged on both sides in the vehicle width direction.

By rotating the base frame 81 with respect to the support brackets 82, the seat cushion 36 is moved between the seating position in which the seat portion is arranged in the substantially horizontal direction as shown in FIG. 3 and the flip-up position in which the seat portion is arranged in the substantially vertical direction as shown in FIG. 4. The seat cushion 36 can be fixed to the seating position or the flip-up position by using a lock mechanism (not shown).

In the present embodiment, the seat 31, specifically the seat cushions 33 and 36 are mounted to the seat mounting frame 60 arranged above the seat cover 50 defining the lower side of the vehicle interior together with the floor panel 27, and the seat mounting frame 60 is mounted to the vehicle body frame 1 arranged below the seat cover 50.

Figure 5:
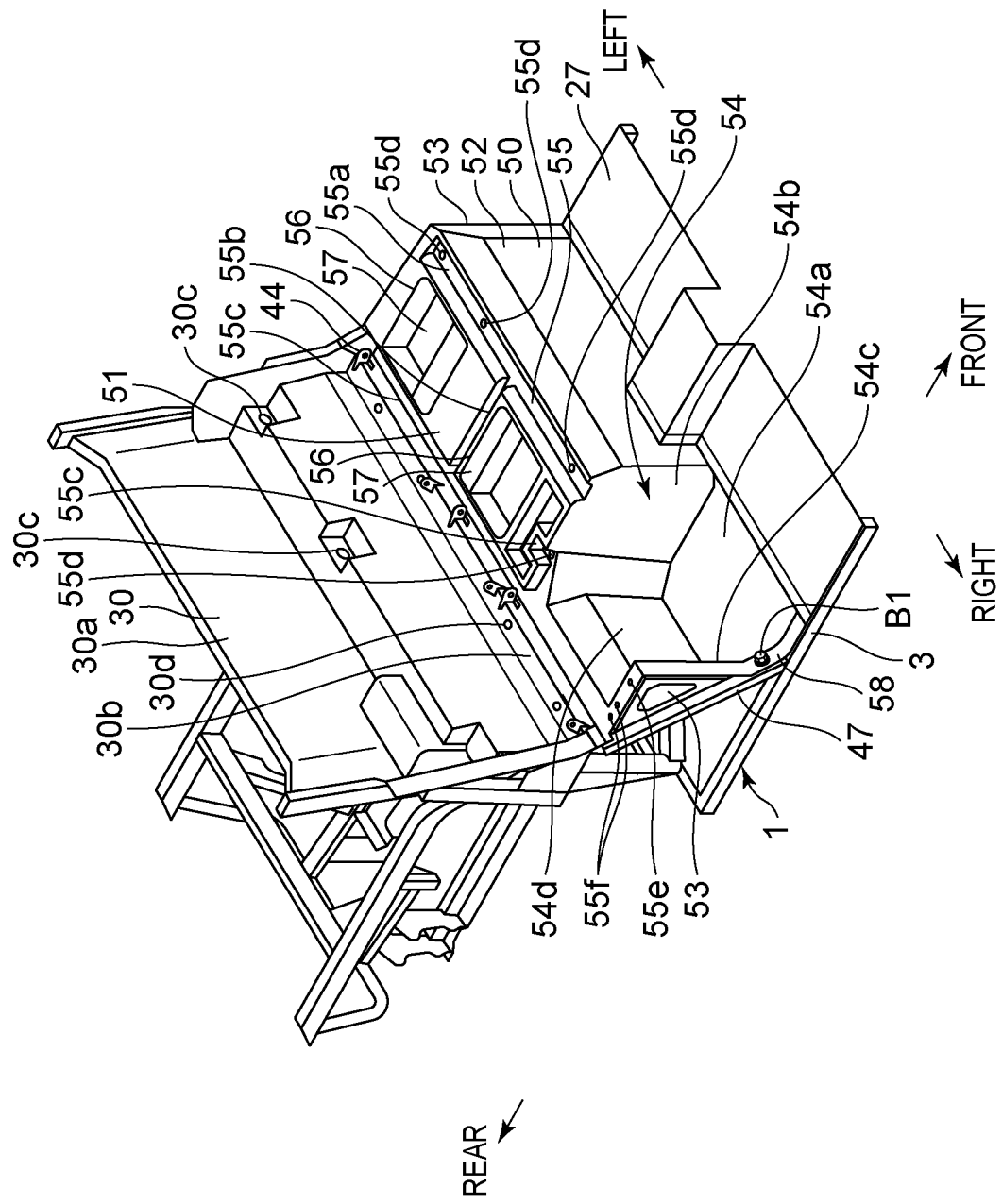
FIG. 5 is a view showing a seat cover and a back panel.

FIG. 5 is a view showing the seat cover 50 and the back panel 30. As shown in FIG. 5, the seat cover 50 is mounted to the vehicle body frame 1, and the floor panel 27 is mounted to the vehicle body frame 1 on the front side of the seat cover 50. The seat cover 50 defines the lower side of the vehicle interior S together with the floor panel 27.

The back panel 30 is mounted to the vehicle body frame 1 on the rear side of the seat cover 50. The lower end portion of the back panel 30 is arranged along the upper surface portion of the first cross frame 43 (see FIG. 2) formed in a substantially rectangular cross section, and the rear end portion of the seat cover 50 is arranged along the front surface portion of the first cross frame 43.

The seat cover 50 is laid on the left and right side frames 3 (see FIG. 2) and the inclined frames 47 (see FIG. 2) and extends in the vehicle width direction. The seat cover 50 includes an upper surface portion 51 that is arranged below the seat 31 and extends in the front-rear direction, and a front surface portion 52 that extends downward from the front side of the upper surface portion 51 and is connected to the floor panel 27. The upper surface portion 51 extends in a direction substantially orthogonal to the up-down direction, and the front surface portion 52 extends in a direction substantially orthogonal to the front-rear direction.

The seat cover 50 also includes side surface portions 53 on both sides that are arranged on both sides in the vehicle width direction and extend in a direction substantially orthogonal to the vehicle width direction. The seat cover 50 is formed so as to cover the entire lower portion of the seat 31 by the upper surface portion 51, the front surface portion 52, and the side surface portions 53 on both sides.

The seat cover 50 has the recessed portion 54 formed below the seat cushion 36 of the bench seat 35 on the right side of the vehicle body on which the bench seat 35 is arranged, which is recessed downward from the upper surface portion 51 and recessed rearward from the front surface portion 52. The recessed portion 54 includes a bottom wall portion 54a extending in the direction substantially orthogonal to the up-down direction so as to be substantially flush with the floor panel 27, an inner wall portion 54b on the inner side in the vehicle width direction, an outer wall portion 54c on the outer side in the vehicle width direction, and a rear wall portion 54d on the rear side of the vehicle body.

In the recessed portion 54 of the seat cover 50, the bottom wall portion 54a is formed in a substantially rectangular shape, so that the front side and the upper side are opened. The recessed portion 54 is also formed so that the front end portion of the outer wall portion 54c is located on the rear side with respect to the front end portion of the inner wall portion 54b. The side surface portion 53 on the right side of the vehicle body of the seat cover 50 is formed so as to be located on the rear side with respect to the front end portion of the inner wall portion 54b of the recessed portion 54 according to the outer wall portion 54c of the recessed portion 54. As shown in FIG. 3, the side panel 16 arranged around the door opening portion on the right side of the vehicle body is also formed so as to be located on the rear side with respect to the front end portion of the inner wall portion 54b of the recessed portion 54 according to the outer wall portion 54c.

The recessed portion 54 of the seat cover 50 is formed not entirely below the seat cushion 36 of the bench seat 35, but below the right side of the vehicle body of the seat cushion 36, and is not formed below the left side of the vehicle body of the seat cushion 36. The recessed portion 54 of the seat cover 50 is not formed on the central side in the vehicle width direction, and when the occupant sits on the bench seat 35 on the central side in the vehicle width direction, the load of the occupant can be supported by a portion in which the recessed portion 54 of the seat cover 50 is not formed.

The upper surface portion 51 of the seat cover 50 is formed with a mounting frame groove portion 55 on which the seat mounting frame 60 is arranged. The mounting frame groove portion 55 includes a first groove portion 55a that is recessed in a substantially rectangular cross section on the front side of the upper surface portion 51 and extends in the vehicle width direction, a second groove portion 55b that is recessed in a substantially rectangular cross section and extends rearward from the central side of the first groove portion 55a in the longitudinal direction, and a third groove portion 55c that is recessed in a substantially rectangular cross section on the rear side with respect to the first groove portion 55a and on the left side of the vehicle body of the recessed portion 54 and extends in the vehicle width direction.

The first groove portion 55a, the second groove portion 55b, and the third groove portion 55c each include a bottom surface portion and side surface portions on both sides extending upward from the bottom surface portion. The bottom surface portion of the first groove portion 55a is formed with through holes 55d through which fastening bolts as connecting portions for connecting the seat mounting frame 60 and the vehicle body frame 1 penetrate. The bottom surface portion of the third groove portion 55c is also formed with a through hole 55d through which a fastening bolt as a connecting portion for connecting the seat mounting frame 60 and the vehicle body frame 1 penetrates. The through hole 55d formed in the bottom surface portion of the third groove portion 55c is formed in the upper end portion of the inner wall portion 54b of the recessed portion 54.

Further, the upper surface portion 51 of the seat cover 50 is formed so that a portion on the right side of the vehicle body with respect to the right end portion of the third groove portion 55c in the vehicle width direction has substantially the same height as the bottom surface portions of the first groove portion 55a, the second groove portion 55b, and the third groove portion 55c. The upper surface portion 51 of the seat cover 50 is formed with a through hole 55e through which a fastening bolt as a connecting portion penetrates at the upper end portion of the outer wall portion 54c of the recessed portion 54 on the right side of the vehicle body. The upper surface portion 51 of the seat cover 50 is also formed with the through holes 55f through which the fastening bolts penetrate behind the through hole 55e at the upper end portion of the outer wall portion 54c of the recessed portion 54 on the right side of the vehicle body.

The upper surface portion 51 of the seat cover 50 is formed with storage box opening portions 56 on both sides of the second groove 55b in the vehicle width direction, and storage boxes 57 are mounted to the storage box opening portions 56 so as to close the storage box opening portions 56. By removing the storage boxes 57, an operator can access the portion below the seat cover 50 through the storage box opening portions 56 to perform work such as filter replacement.

The seat cover 50 includes left and right mounting portions 58 to be mounted to the vehicle body frame 1 on both sides in the vehicle width direction, and the mounting portions 58 are formed with through holes through which fastening bolts as connecting portions for connecting the seat cover 50 and the vehicle body frame 1 penetrate, respectively. The seat cover 50 is mounted to the vehicle body frame 1 by mounting fastening bolts B1 to the screw holes 47a of the inclined frames 47 through the through holes of the mounting portions 58. The seat cover 50 and the floor panel 27 may be integrally formed.

The back panel 30 is mounted to the left and right rear ROPS support frames 8 and extends in the vehicle width direction. The back panel 30 includes a rear surface portion 30a that is arranged behind the seat 31 and extends in the up-down direction, and a bottom surface portion 30b extending from the lower side of the rear surface portion 30a to the front side.

The rear surface portion 30a of the back panel 30 is formed with through holes 30c for mounting the seat backs 34 and 37. The bottom surface portion 30b of the back panel 30 is arranged along the first cross frame 43. The bottom surface portion 30b of the back panel 30 is formed with through holes 30d for mounting the slide mechanism 70, and the through holes 30d are provided corresponding to the screw holes 43a of the first cross frame 43.

Figure 6:
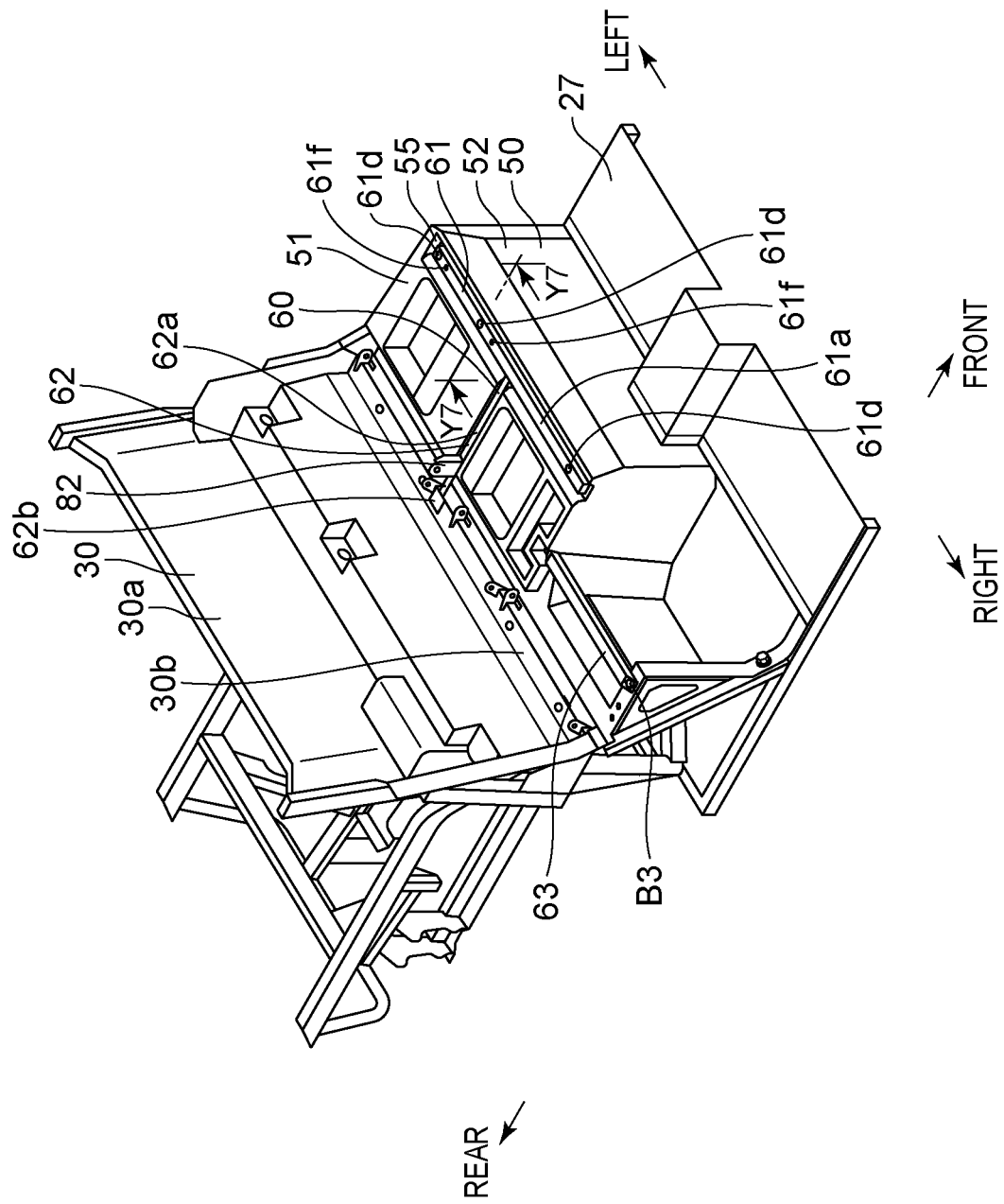
FIG. 6 is a view showing a seat mounting frame.

FIG. 6 is a view showing the seat mounting frame. FIG. 6 shows a state in which the seat mounting frame 60 is arranged above the seat cover 50 shown in FIG. 5. As shown in FIG. 6, when the composite type seat 31 is arranged, the seat mounting frame 60 for the composite type is arranged above the seat cover 50, and the seat mounting frame 60 is mounted to the vehicle body frame 1 via the seat cover 50.

The seat mounting frame 60 includes a first frame portion 61 extending linearly in the vehicle width direction, a second frame portion 62 that is connected to the central side of the first frame portion 61 in the longitudinal direction and extends linearly rearward from the first frame portion 61, and a third frame portion 63 that extends linearly in the vehicle width direction on the rear side of the first frame portion 61 and on the right side of the vehicle body of the second frame portion 62.

Figure 7:
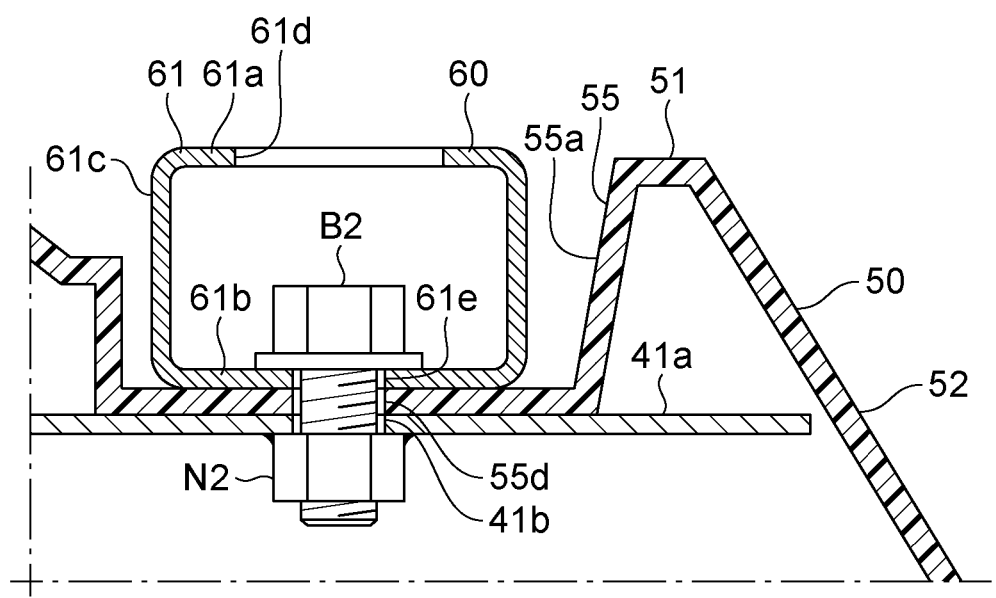
FIG. 7 is a cross-sectional view of the vehicle body frame, the seat cover, and the seat mounting frame along the line Y7-Y7 of FIG. 6.

FIG. 7 is a cross-sectional view of the vehicle body frame 1, the seat cover 50, and the seat mounting frame 60 along the line Y7-Y7 of FIG. 6. The first frame portion 61 is arranged in the first groove portion 55a. The first frame portion 61 is provided so as not to overlap the recessed portion 54 formed in the seat cover 50. As a result, when an object is housed in the recessed portion 54 of the seat cover 50, the object can be easily accessed and taken out from above. The first frame portion 61 includes an upper surface portion 61a, a lower surface portion 61b, and side surface portions 61c on both sides, and is formed in a tubular shape having a substantially rectangular cross section.

The upper surface portion 61a of the first frame portion 61 is formed with mounting opening portions 61d, and the lower surface portion 61b of the first frame portion 61 is formed with a through hole 61e through which a fastening bolt as a connecting portion for connecting the seat mounting frame 60 and the vehicle body frame 1 penetrates. As shown in FIGS. 6 and 7, three mounting opening portions 61d are formed in the first frame portion 61 so as to be spaced apart from each other in the vehicle width direction, and through holes 61e are formed below the mounting opening portions 61d, respectively. The first frame portion 61 is also formed with screw holes 61f for mounting the slide mechanism 70 to the upper surface portion 61a, which are spaced apart from each other in the vehicle width direction.

As shown in FIG. 7, the first frame portion 61 is mounted to the vehicle body frame 1 with the seat cover 50 interposed therebetween by screwing fastening bolts B2 inserted from the mounting opening portions 61d into nuts N2 through the through holes 61e, the through holes 55d (see FIG. 5) of the seat cover 50, and the through holes 41b (see FIG. 2) of the mounting brackets 41a. The fastening bolts B2 are mounted to the three through holes 61e of the first frame portion 61, respectively. The fastening bolts B2 to be mounted to the two through holes 61e on the right side of the first frame portion 61 are screwed into the nuts N2 through the through holes 41b of the mounting brackets 41a, whereas the fastening bolt to be mounted to one through hole 61e on the left side of the first frame portion 61 is screwed into the nut welded to the mounting bracket 42a through the through hole 42b of the mounting bracket 42a.

The second frame portion 62 is arranged in the second groove portion 55b of the mounting frame groove portion 55 in the seat cover 50. Similarly to the first frame portion 61, the second frame portion 62 includes an upper surface portion 62a, a lower surface portion, and side surface portions on both sides, and is formed in a tubular shape having a substantially rectangular cross section. The rear end portion of the second frame portion 62 is provided with an extension portion 62b extending rearward in a planar shape, and the extension portion 62b is supported by the first cross frame 43 via the bottom surface portion 30b of the back panel 30.

The upper surface portion 62a of the second frame portion 62 is formed with a screw hole (not shown) for mounting the support bracket 82 on the left side of the vehicle body on the rear side. The support bracket 82 on the left side of the vehicle body is mounted to the second frame portion 62 by mounting the fastening bolt to the screw hole of the second frame portion 62 through the through hole in the bottom surface portion of the support bracket 82. The support bracket 82 on the left side of the vehicle body is mounted to the second frame portion 62 after the second frame portion 62 is arranged on the seat cover 50, but the support bracket 82 may be mounted to the second frame portion 62 before the second frame portion 62 is arranged on the seat cover 50.

Similarly to the first frame portion 61, the third frame portion 63 of the seat mounting frame 60 includes an upper surface portion, a lower surface portion, and side surface portions on both sides, and is formed in a tubular shape having a substantially rectangular cross section. The third frame portion 63 is formed so as to be inclined downward at both end portions thereof in the vehicle width direction toward the outside in the vehicle width direction. The third frame portion 63 is formed with through holes (not shown) through which fastening bolts as connecting portions penetrate on the lower surface portions of both end portions in the vehicle width direction. The through holes of the third frame portion 63 are formed corresponding to the through holes 55d and 55e (see FIG. 5) on both sides of the recessed portion 54 of the seat cover 50 in the vehicle width direction.

The inner end portion of the third frame portion 63 in the vehicle width direction is arranged in the third groove portion 55c. The third frame portion 63 is mounted to the vehicle body frame 1 with the seat cover 50 interposed therebetween by screwing a fastening bolt B3 as a connecting portion into the nut welded to the main support frame 45 through the through hole of the third frame portion 63, the through hole 55d of the seat cover 50, and the through hole 45a (see FIG. 2) of the main support frame 45 at the inner end portion in the vehicle width direction and screwing a fastening bolt B3 as a connecting portion into the nut welded to the triangular frame 48 through the through hole of the third frame portion 63, the through hole 55e of the seat cover 50, and the through hole 48d (see FIG. 2) of the triangular frame 48 at the outer end portion in the vehicle width direction.

In this way, in the seat mounting frame 60 arranged above the seat cover 50, the first frame portion 61 and the third frame portion 63 are connected to the vehicle body frame 1, so that the seat mounting frame 60 is removably mounted to the vehicle body frame 1 with the seat cover 50 interposed therebetween. In the seat mounting frame 60, in addition to the portion to be fixed to the seat support frame 40, a portion to be mounted on the seat support frame 40 with the seat cover 50 interposed therebetween is formed. As a result, the load acting on the seat mounting frame 60 is transmitted to the seat support frame 40 via the seat cover 50, and the load can be further supported.

Figure 8:
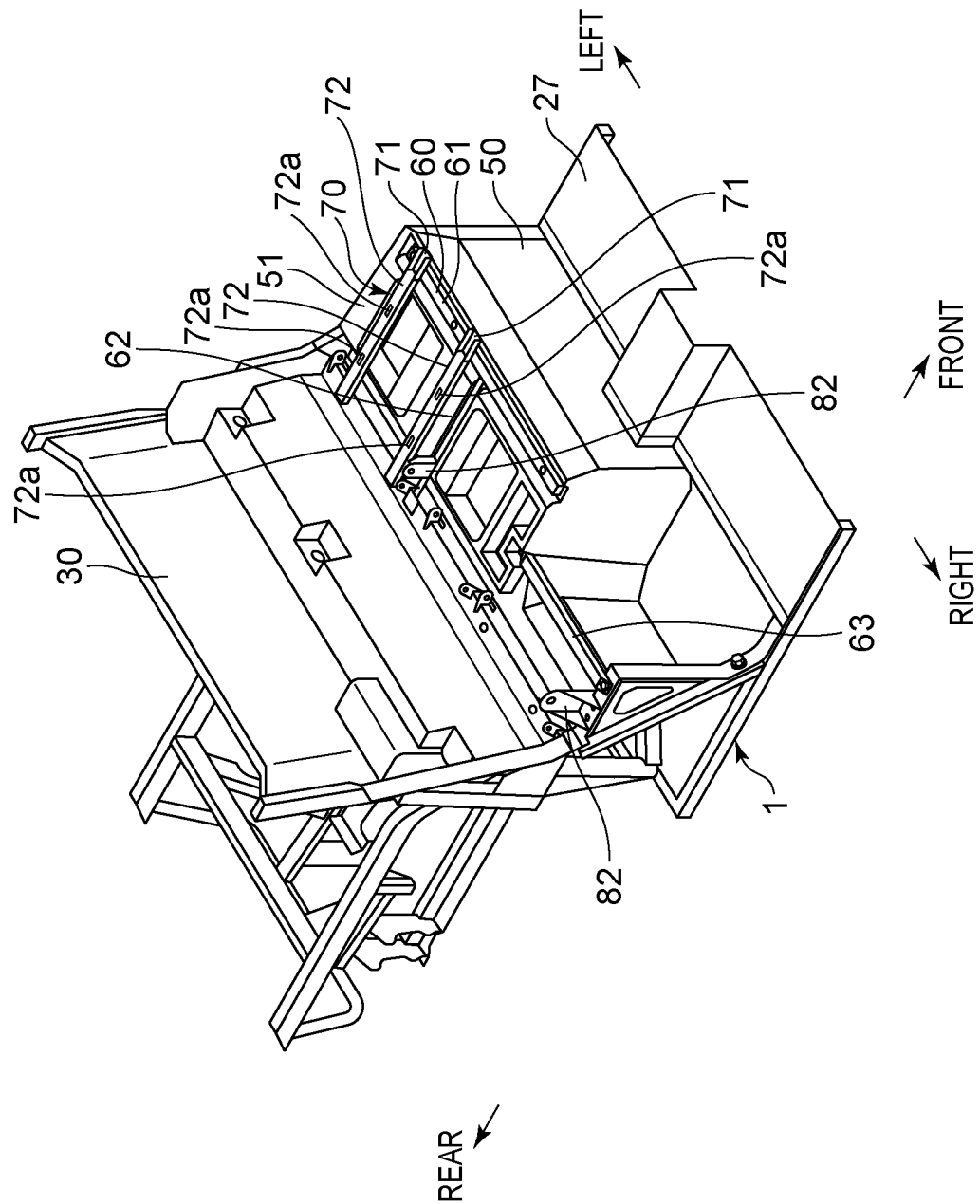
FIG. 8 is a view showing a slide mechanism mounted to the seat mounting frame.

FIG. 8 is a view showing the slide mechanism mounted to the seat mounting frame. As shown in FIG. 8, the slide mechanism 70 configured to move the seat in the front-rear direction is mounted to the seat mounting frame 60. The slide mechanism 70 includes a pair of left and right rails 71 and a pair of left and right sliders 72.

The left and right rails 71 are arranged in parallel to each other so as to extend in the front-rear direction. The rails 71 are, for example, rail grooves opened upward. Through holes through which fastening bolts as fastening portions penetrate are formed on the front side and the rear side of each of the rails 71, respectively.

The left and right rails 71 are removably mounted to the seat mounting frame 60 and the first cross frame 43 by mounting the fastening bolts to the screw holes 61*f* (see FIG. 6) of the first frame portion 61 through the through holes on the front side and mounting the fastening bolts to the screw holes 43*a* (see FIG. 2) of the first cross frame 43 through the through holes on the rear side and the through holes 30*d* (see FIG. 5) of the back panel 30.

The left and right sliders 72 are engaged with the rails 71 so as to be movable in the front-rear direction along the rails 71, respectively. The slide mechanism 70 is mounted to the seat mounting frame 60 by mounting the left and right rails 71 to the seat mounting frame 60 under a state in which the sliders 72 are engaged with the rails 71.

Mounting holes 72*a* for mounting the seat cushion 33 of the separate seat 32 are formed on the central sides of the sliders 72 in the front-rear direction. Connecting pins protruding downward corresponding to the mounting holes 72*a* of the sliders 72 are mounted to the seat cushion frame 33*a* of the seat cushion 33. The seat cushion 33 is mounted to the sliders 72 by inserting and mounting the connecting pins mounted to the seat cushion frame 33*a* into the mounting holes 72*a*. The seat cushion frame 33*a* is mounted to and supported by the seat mounting frame 60 via the slide mechanism 70.

In this way, by inserting and mounting the connecting pins provided to the seat cushion 33 of the separate seat 32 into the mounting holes 72*a* provided in the sliders 72, the seat cushion 33 is removably mounted to the seat mounting frame 60 and the first cross frame 43 via the slide mechanism 70.

Further, the support bracket 82 on the right side of the vehicle body is mounted to the vehicle body frame 1 with the seat cover 50 interposed therebetween by screwing fastening bolts (not shown) into the screw holes 48*e* of the upper surface portion 48*a* of the triangular frame 48 through the through holes 83*a* (see FIG. 4) of the bottom surface portion 83 of the support bracket 82 on the right side of the vehicle body and the through holes 55*f* (see FIG. 5) of the upper surface portion 51, in the upper surface portion 51 of the seat cover 50. The support bracket 82 on the left side of the vehicle body is mounted to the upper surface portion of the second frame portion 62 (see FIG. 6) of the seat mounting frame 60. The support brackets 82 on the right side of the vehicle body and the left side of the vehicle body are mounted above the seat cover 50.

In the seat cover 50, the support bracket 82 for supporting the seat 31 from below is provided on the outer wall portion 54*c* of the recessed portion 54 on the right side of the vehicle body, and the seat cover 50 is formed with the through holes 55*f* through which the fastening bolts as connecting portions for connecting the support bracket 82 and the vehicle body frame 1 penetrate.

The seat cushion 36 of the bench seat 35 is removably mounted to the seat mounting frame 60 so as to be movable between the seating position and the flip-up position by fixing the base frame 81 to the seat cushion frame 36*a*, and then inserting the pin portions 81*d* on both sides of the base frame 81 in the vehicle width direction into the pin holes 84*a* of the support brackets 82 on both sides in the vehicle width direction so as to be supported. The seat cushion frame 36*a* is mounted to and supported by the seat mounting frame 60 via the flip-up mechanism 80. In the present embodiment,
the support bracket 82 on the right side of the vehicle body is mounted to the seat cover 50, but the support bracket 82 may be mounted to the third frame portion 63 of the seat mounting frame 60.

In this way, the composite type seat 31 is mounted to the seat mounting frame 60 arranged below the seat 31, and the seat mounting frame 60 is mounted to the vehicle body frame 1 arranged below the seat mounting frame 60. The seat mounting frame 60 is removably mounted to the vehicle body frame 1 with the seat cover 50, which is arranged below the seat 31 and covers the seat 31 from below, interposed therebetween. The seat cover 50 is formed with the through holes 55*d* and 55*e* through which the connecting portions for connecting the seat mounting frame 60 and the vehicle body frame 1 penetrate, and the seat cover 50 is interposed in the portion between the seat mounting frame 60 and the vehicle body frame 1 excluding the through holes 55*d* and 55*e*.

In the present embodiment, the seat cover 50 is made of resin and integrally molded using a resin material. The vehicle body frame 1 and the seat mounting frame 60 are made of metal, and are formed by connecting metal pipes formed in a tubular shape, metal plates, and the like by welding or the like.

In the utility vehicle 10, the seat cushions 33 and 36 and the seat backs 34 and 37 are mounted to the seat cover 50 and the back panel 30, respectively, and the seat cushions 33 and 36 and the seat backs 34 and 37 are separately configured. However, the seat backs 34 and 37 may be integrally formed with the seat cushions 33 and 36 and the seat cushions 33 and 36 may be mounted to the vehicle body frame 1 via the seat cover 50.

As a composite type seat, a bench seat for a driver and a separate seat for an assistant, who is an occupant excluding the driver, may be arranged side by side in the vehicle width direction.

Next, a case where a bench seat type seat is mounted to the utility vehicle 10 will be described.

Figure 9:
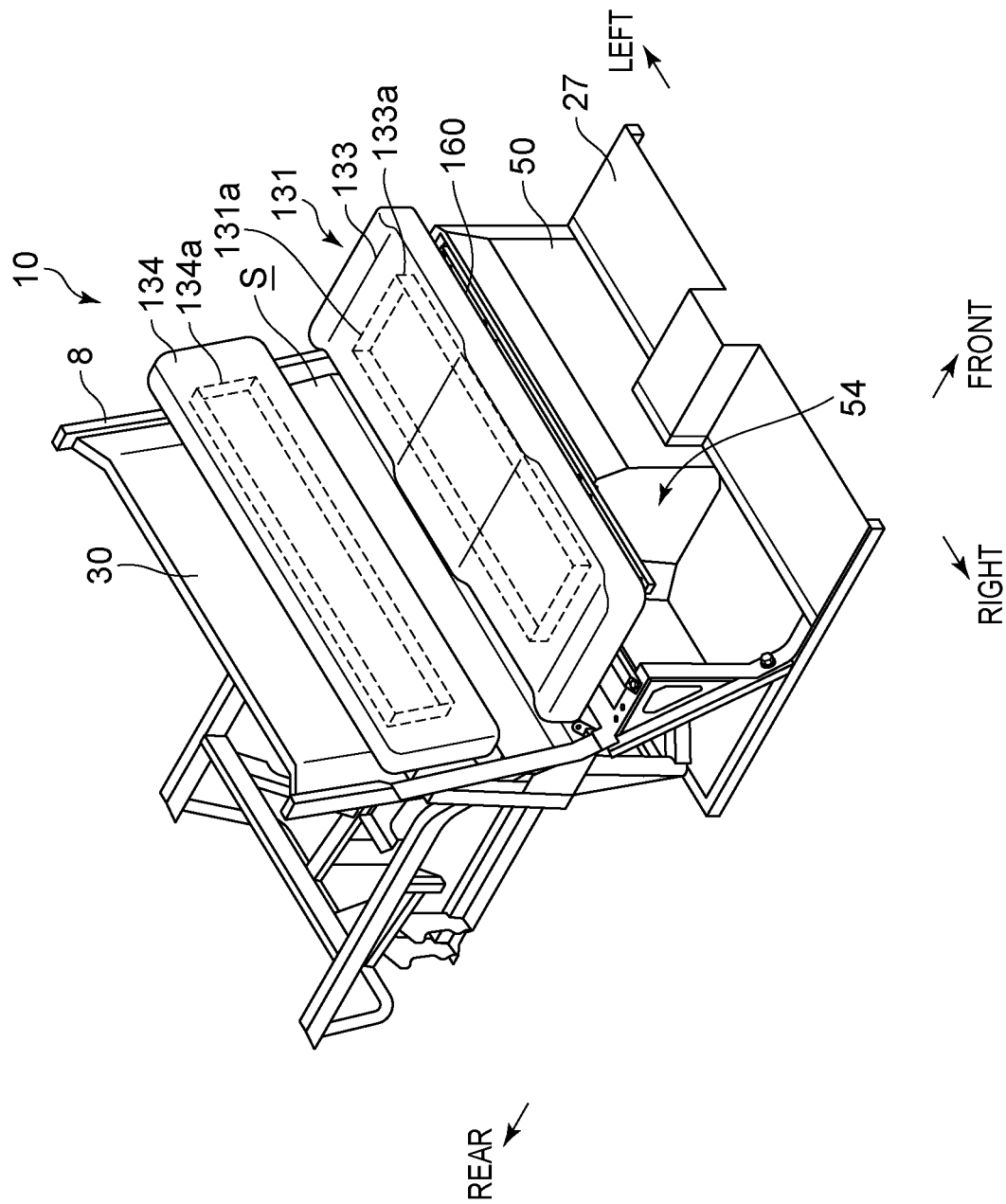
FIG. 9 is a perspective view of a vehicle interior provided with a bench seat type seat.

FIG. 9 is a perspective view of a vehicle interior provided with the bench seat type seat. As shown in FIG. 9, a bench seat type seat 131 can be mounted to the utility vehicle 10. The bench seat type seat 131 is a bench seat 131 that is formed longer in the vehicle width direction than the composite type bench seat 35 and can be seated by a driver and an occupant excluding the driver.

The bench seat 131 includes a seat cushion 133 which is a seat portion and a seat back 134 which is a backrest portion. Inside the bench seat 131, a seat inner frame 131*a* forming the skeleton of the bench seat 131 is arranged. As the seat inner frame 131*a*, a seat cushion frame 133*a* is arranged inside the seat cushion 133, and a seat back frame 134*a* is arranged inside the seat back 134.

Also regarding the bench seat type seat 131, the seat back 134 is removably mounted to the second cross frame 44 (see FIG. 2) with the back panel 30 interposed therebetween by mounting fastening bolts to mounting brackets fixed to the seat back frame 134*a* through the through holes 30*c* (see FIG. 5) of the back panel 30 and the through holes 44*a* (see FIG. 2) of the second cross frame 44. The seat cushion 133 is removably mounted to a seat mounting frame 160 arranged above the seat cover 50 that covers the lower part of the seat 131.

Figure 10:
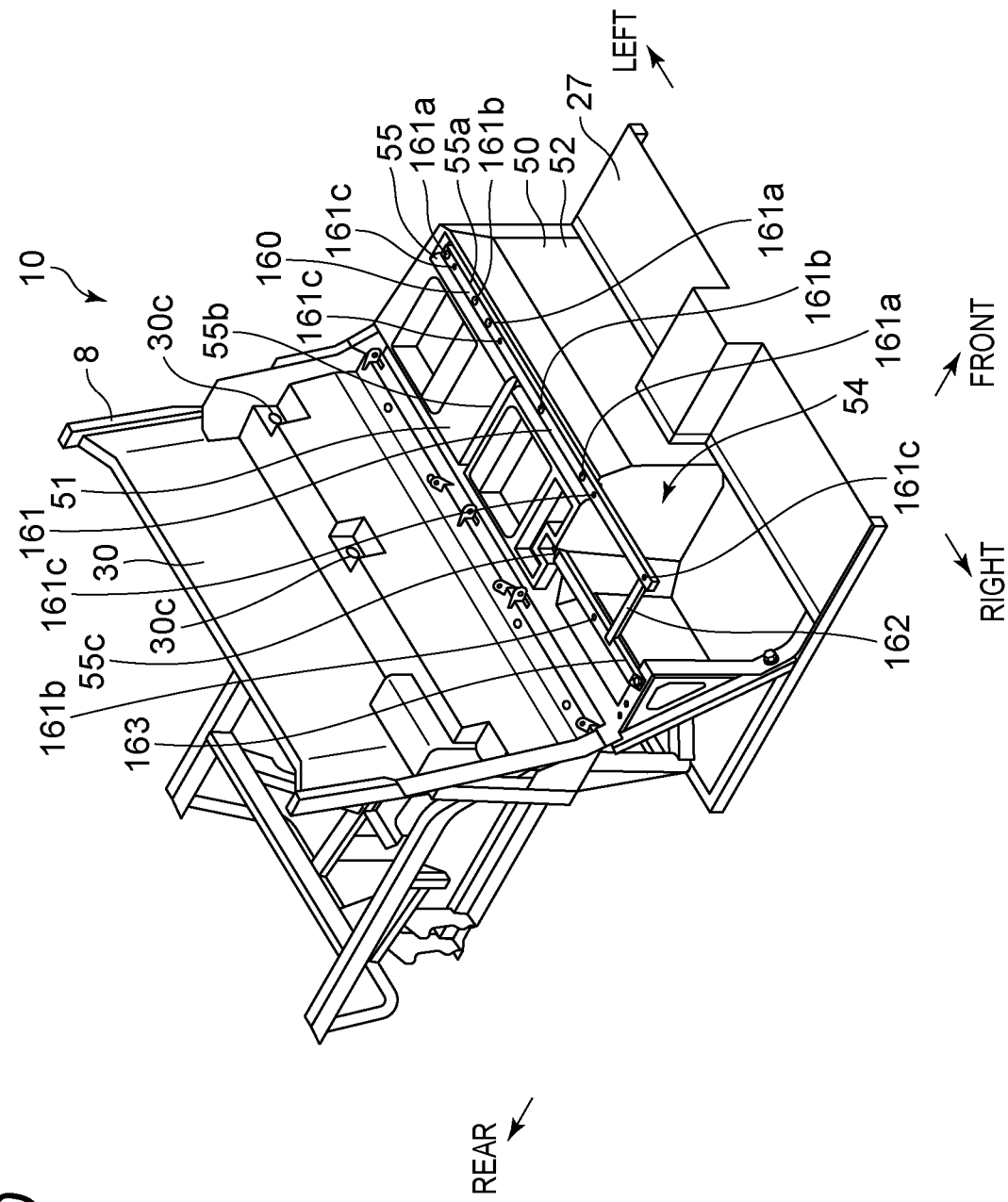
FIG. 10 is a view showing a seat mounting frame when the bench seat type seat is arranged.

FIG. 10 is a view showing the seat mounting frame 160 when the bench seat type seat 131 is arranged. In this case, the seat mounting frame 160 for the bench seat type is arranged above the seat cover 50 common to the composite type seat 31, and the seat mounting frame 160 is mounted to the vehicle body frame 1 via the seat cover 50.

The seat mounting frame 160 includes a first frame portion 161 extending linearly in the vehicle width direction, a second frame portion 162 that is connected to the vicinity of the right end portion of the first frame portion 161 in the vehicle width direction and extends linearly rearward from the first frame portion 161, and a third frame portion 163 that is connected to the rear side of the second frame portion 162 and extends linearly in the vehicle width direction.

The first frame portion 161 is arranged in the first groove portion 55*a*. The right side of the first frame portion 161 in the vehicle width direction extends beyond the right end portion of the first groove portion 55*a* and extends to the right side in the vehicle width direction. Similarly to the first frame portion 61 of the seat mounting frame 60, the first frame portion 161 includes an upper surface portion, a lower surface portion, and side surface portions on both sides, and is formed in a tubular shape having a substantially rectangular cross section.

Also regarding the first frame portion 161, similarly to the first frame portion 61 of the seat mounting frame 60, the upper surface portion of the first frame portion 161 is formed with mounting opening portions 161*a*, and the lower surface portion of the first frame portion 161 is formed with through holes through which fastening bolts as connecting portions for connecting the seat mounting frame 160 and the vehicle body frame 1 penetrate. Three mounting opening portions 161*a* and three through holes are formed in the first frame portion 161 so as to be spaced apart from each other in the vehicle width direction.

The first frame portion 161 is also mounted to the vehicle body frame 1 with the seat cover 50 interposed therebetween by screwing the fastening bolts inserted from the mounting opening portions 161*a* into the nuts N2 through the through holes, the through holes 55*d* (see FIG. 5) of the seat cover 50, and the through holes 41*b* (see FIG. 2) of the mounting brackets 41*a*. The fastening bolts are mounted to the three through holes of the first frame portion 161, respectively. The fastening bolts to be mounted to the two through holes on the right side of the first frame portion 161 are screwed into the nuts N2 through the through holes 41*b* (see FIG. 2) of the mounting brackets 41*a*, whereas the fastening bolt to be mounted to one through hole on the left side of the first frame portion 161 is screwed into the nut welded to the mounting bracket 42*a* through the through hole 42*b* (see FIG. 2) of the mounting bracket 42*a*. The second frame portion 162 also includes an upper surface portion, a lower surface portion, and side surface portions on both sides, and is formed in a tubular shape having a substantially rectangular cross section.

The third frame portion 163 of the seat mounting frame 160 is formed in the same manner as the third frame portion 63 of the seat mounting frame 60. The third frame portion 163 includes an upper surface portion, a lower surface portion, and side surface portions on both sides, and is formed in a tubular shape having a substantially rectangular cross section. The third frame portion 163 is formed so as to be inclined downward at both end portions thereof in the vehicle width direction toward the outside in the vehicle width direction.

The third frame portion 163 is formed with through holes through which fastening bolts as connecting portions penetrate on the lower surface portions of both end portions in the vehicle width direction. The through holes of the third frame portion 163 are formed corresponding to the through holes 55*d* and 55*e* (see FIG. 5) on both sides of the recessed portion 54 of the seat cover 50 in the vehicle width direction.

The inner end portion of the third frame portion 163 in the vehicle width direction is arranged in the third groove portion 55*c*. The third frame portion 163 is mounted to the vehicle body frame 1 with the seat cover 50 interposed therebetween by screwing the fastening bolt B3 as the connecting portion into the nut welded to the main support frame 45 through the through hole of the third frame portion 163, the through hole 55*d* of the seat cover 50, and the through hole 45*a* (see FIG. 2) of the main support frame 45 at the inner end portion in the vehicle width direction and screwing the fastening bolt B3 as the connecting portion into the nut welded to the triangular frame 48 through the through hole of the third frame portion 163, the through hole 55*e* of the seat cover 50, and the through hole 48*d* (see FIG. 2) of the triangular frame 48 at the outer end portion in the vehicle width direction.

In this way, in the seat mounting frame 160 arranged above the seat cover 50, the first frame portion 161 and the third frame portion 163 are mounted to the vehicle body frame 1, so that the seat mounting frame 160 is removably mounted to the vehicle body frame 1 with the seat cover 50 interposed therebetween. Also regarding the seat mounting frame 160, in addition to the portion to be fixed to the seat support frame 40, a portion to be mounted on the seat support frame 40 with the seat cover 50 interposed therebetween is formed. As a result, the load acting on the seat mounting frame 160 is transmitted to the seat support frame 40 via the seat cover 50, and the load can be further supported.

The seat mounting frame 160 is also formed with mounting holes 161*b* for mounting the seat cushion 133 of the bench seat 131. Two mounting holes 161*b* are formed in the upper surface portion of the first frame portion 161 so as to be spaced apart from each other in the vehicle width direction, and one mounting hole 161*b* is formed in the upper surface portion of the third frame portion 163.

Connecting pins protruding downward corresponding to the mounting holes 161*b* of the first frame portion 161 are mounted to the seat cushion frame 133*a* of the seat cushion 133. The seat cushion 133 is mounted to the seat mounting frame 160 by inserting and mounting the connecting pins mounted to the seat cushion frame 133*a* into the mounting holes 161*b*. The seat cushion frame 133*a* is mounted to and supported by the seat mounting frame 160.

The seat mounting frame 160 is also formed with screw holes 161*c* for mounting the slide mechanism 70 when a separate seat type seat is mounted in the upper surface portion of the first frame portion 161. Four screw holes 161*c* are formed in the upper surface portion of the first frame portion 161 so as to be spaced apart from each other in the vehicle width direction.

When the bench seat type seat 131 is arranged in this way, the bench seat type seat 131 is mounted to the seat mounting frame 160 arranged below the seat 131, and the seat mounting frame 160 is mounted to the vehicle body frame 1 arranged below the seat mounting frame 160. The seat mounting frame 160 is mounted to the vehicle body frame 1 with the seat cover 50, which is arranged below the seat 131 and covers the seat 131 from below, interposed therebetween.

The seat cover 50 is formed with the through holes 55*d* and 55*e* (see FIG. 5) through which the connecting portions for connecting the seat mounting frame 160 and the vehicle body frame 1 penetrate, and the seat cover 50 is interposed in the portion between the seat mounting frame 60 and the vehicle body frame 1 excluding the through holes 55*d* and 55*e*.

Even when the bench seat type seat 131 is arranged, the seat back 134 may be integrally formed with the seat cushion 133 and the seat cushion 133 may be mounted to the vehicle body frame 1 via the seat cover 50.

Next, a case where a separate seat type seat is mounted to the utility vehicle 10 will be described.

Figure 11:
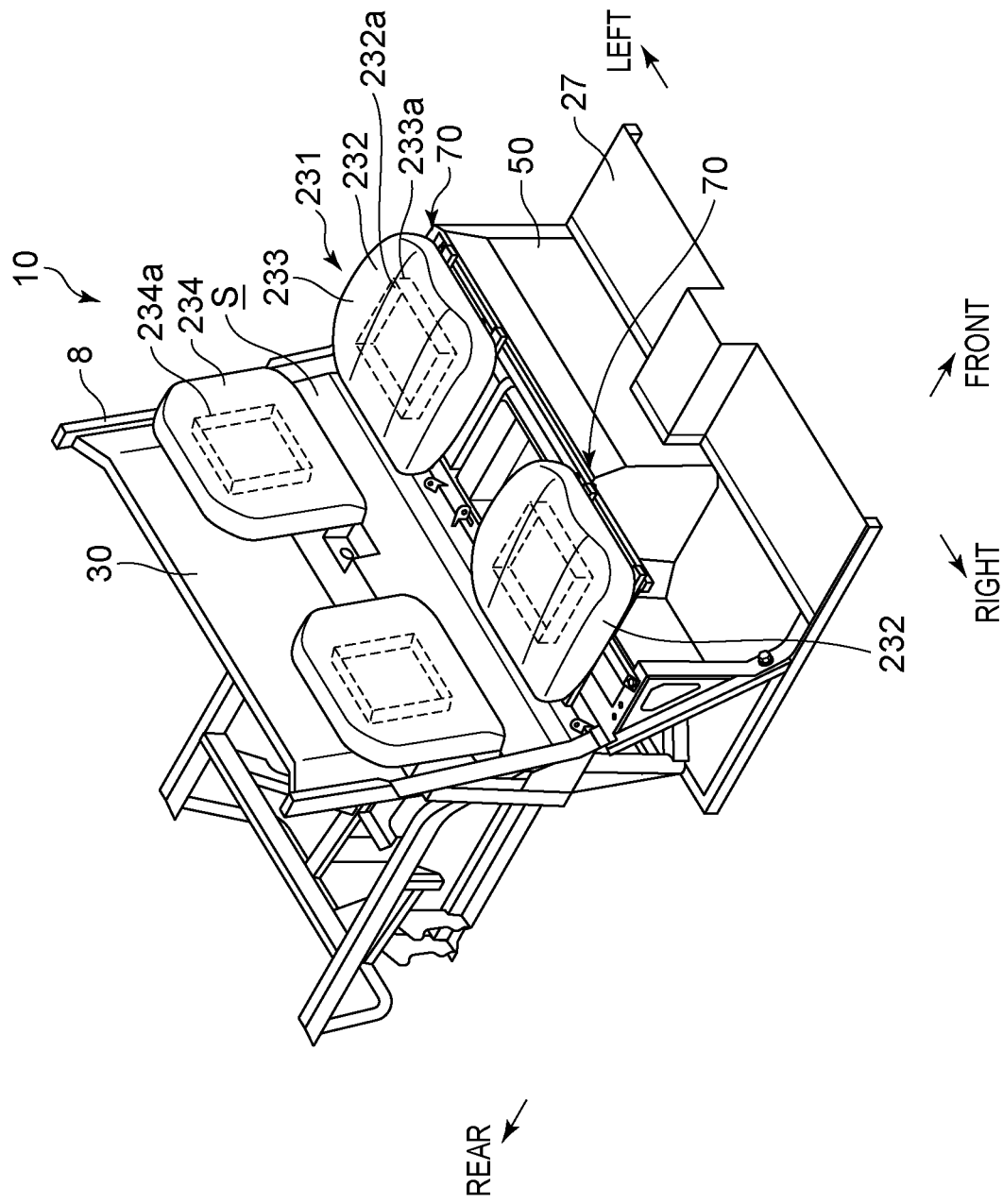
FIG. 11 is a perspective view of a vehicle interior provided with a separate seat type seat.

FIG. 11 is a perspective view of a vehicle interior provided with the separate seat type seat. As shown in FIG. 11, a separate seat type seat 231 can be mounted to the utility vehicle 10. The separate seat type seat 231 is a seat 231 in which two separate seats 232 are arranged side by side in the vehicle width direction. A separate seat 232 for a driver is arranged on the left side of the vehicle body, and a separate seat 232 for an occupant is arranged on the right side of the vehicle body.

Each separate seat 232 is formed in the same manner as the composite type separate seat 32, and includes a seat cushion 233 and a seat back 234. Inside the separate seat 232, a seat inner frame 232*a* forming the skeleton of the separate seat 232 is arranged. As the seat inner frame 232*a*, a seat cushion frame 233*a* is arranged inside the seat cushion 233, and a seat back frame 234*a* is arranged inside the seat back 234.

Also regarding the separate seat type seat 231, each seat back 234 is removably mounted to the second cross frame 44 (see FIG. 2) with the back panel 30 interposed therebetween by mounting fastening bolts to mounting brackets fixed to the seat back frame 234*a* through the through holes 30*c* (see FIG. 5) of the back panel 30 and the through holes 44*a* (see FIG. 2) of the second cross frame 44.

The seat cushion 233 of the separate seat 232 is removably mounted to the seat mounting frame 160 arranged above the seat cover 50 that covers the lower part of the seat 231 via the slide mechanism 70. The seat mounting frame 160 for the separate seat type is used in common with the seat mounting frame 160 for the bench seat type. That is, the seat mounting frame 160 for the separate seat type and the seat mounting frame 160 for the bench seat type are common. The slide mechanism 70 for the separate seat type is formed in the same manner as the slide mechanism 70 for the composite type.

Figure 12:
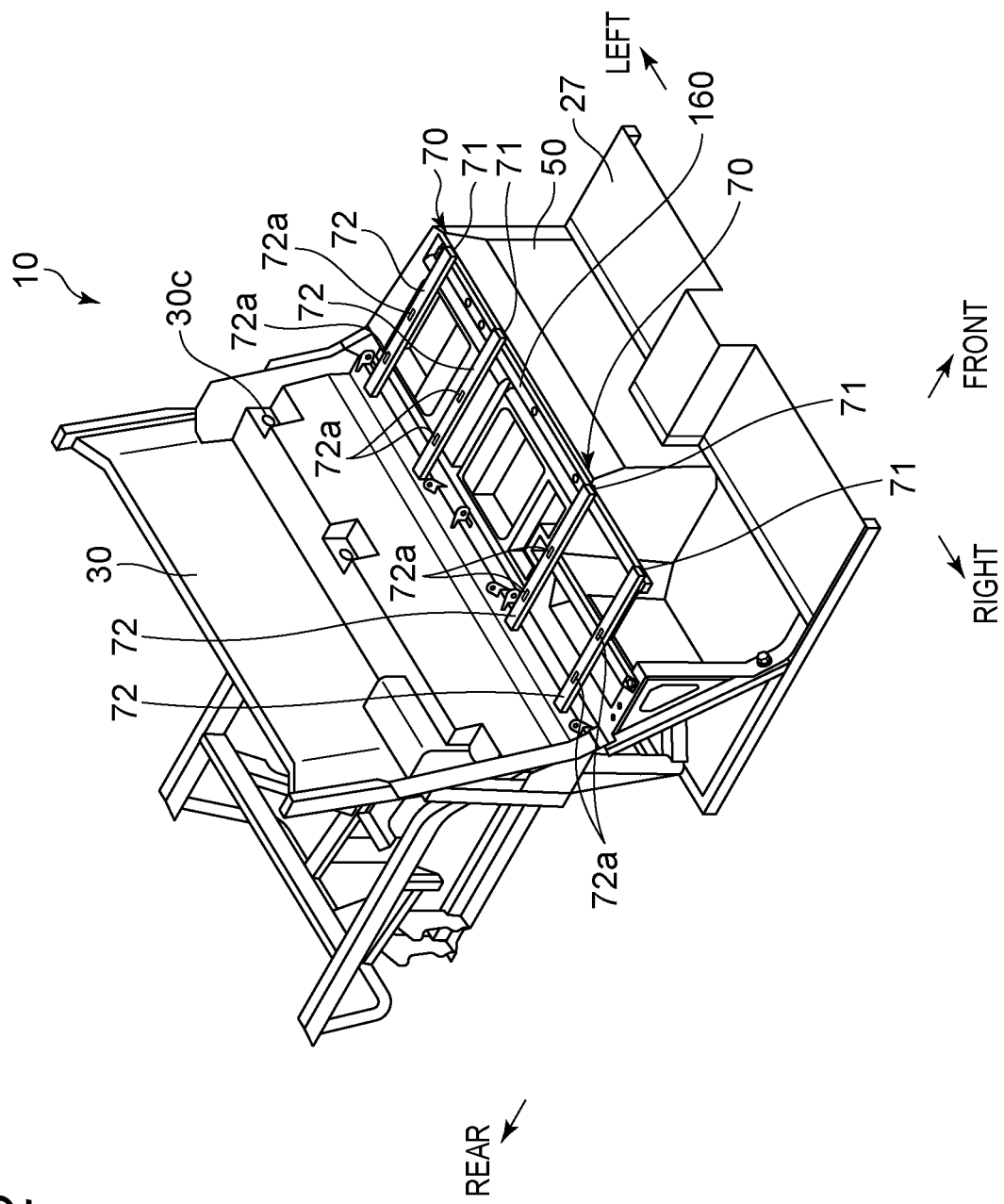
FIG. 12 is a view showing slide mechanisms mounted to the seat mounting frame.

FIG. 12 is a view showing the slide mechanisms 70 mounted to the seat mounting frame 160. When the separate seat type seat 231 (see FIG. 11) is arranged, the seat mounting frame 160 is arranged above the common seat cover 50, and the seat mounting frame 160 is removably mounted to the vehicle body frame 1 via the seat cover 50 in the same manner as when the bench seat type seat 131 is arranged.

As shown in FIG. 11, when the separate seat type seat 231 is arranged, the slide mechanisms 70 configured to move the left and right separate seats 232, respectively, in the front-rear direction are mounted to the seat mounting frame 160. As described above, each of the slide mechanisms 70 includes the pair of left and right rails 71 and the pair of left and right sliders 72.

Under the state in which the sliders 72 are engaged with the rails 71, respectively, the left and right rails 71 of the slide mechanism 70 on the left side of the vehicle body are removably mounted to the seat mounting frame 160 and the first cross frame 43 (see FIG. 2) by mounting the fastening bolts to the screw holes 161*c* (see FIG. 10) of the first frame portion 161 on the left side of the vehicle body through the through holes on the front side and mounting the fastening bolts to the screw holes 43*a* (see FIG. 2) of the first cross frame 43 through the through holes on the rear side and the through holes 30*d* (see FIG. 5) of the back panel 30.

Similarly to the separate seat 32, in the separate seat 232 on the left side of the vehicle body, connecting pins protruding downward corresponding to the mounting holes 72*a* of the sliders 72 are mounted to the seat cushion frame 233*a*. The seat cushion 233 is mounted to the sliders 72 by inserting and mounting the connecting pins mounted to the seat cushion frame 233*a* into the mounting holes 72*a*. The separate seat 232 on the right side of the vehicle body is also configured in the same manner as the separate seat 232 on the left side of the vehicle body.

When the separate seat type seat 231 is arranged in this way, the separate seat type seat 231 is mounted to the seat mounting frame 160 arranged below the seat 231, and the seat mounting frame 160 is mounted to the vehicle body frame 1 arranged below the seat mounting frame 160. The seat mounting frame 160 is mounted to the vehicle body frame 1 with the seat cover 50, which is arranged below the seat 231 and covers the seat 231 from below, interposed therebetween.

The seat cover 50 is formed with the through holes 55*d* and 55*e* (see FIG. 5) through which the connecting portions for connecting the seat mounting frame 160 and the vehicle body frame 1 penetrate, and the seat cover 50 is interposed in the portion between the seat mounting frame 160 and the vehicle body frame 1 excluding the through holes 55*d* and 55*e*.

Even when the separate seat type seat 231 is arranged, the seat back 234 may be integrally formed with the seat cushion 233 and the seat cushion 233 may be mounted to the vehicle body frame 1 via the seat cover 50.

In the utility vehicle 10, the mounting positions for mounting the seats 31, 131, and 231 to the seat mounting frames 60 and 160 may differ depending on the seats 31, 131, and 231, but the mounting positions for mounting the seat mounting frames 60 and 160 to the vehicle body frame 1 are set to be the same regardless of the seats 31, 131, and 231.

When the utility vehicle 10 is manufactured, the vehicle body frame 1 common to the multiple seat types is assembled, the seat cover 50 common to the multiple seat types is mounted above the vehicle body frame 1, the seat mounting frame 60 or 160 according to one of the multiple seat types is prepared, the seat mounting frame 60 or 160 is mounted above the seat cover 50, and the seat 30, 130, or 230 of the one of the multiple seat types is mounted to the seat mounting frame 60 or 160.

In the utility vehicle 10, when the bench seat type seat 131 or the separate seat type seat 231 is arranged, the support bracket 82 on the right side of the vehicle body is removed. In such a case, the airtightness of the vehicle interior S can be improved by using plugs or the like that close the through holes 55*f* for the support bracket 82 provided in the seat cover 50. The seat cover 50 is closed in an area excluding an opening for connecting the seat support frame 40 and the seat mounting frame 60 or 160. In other words, the seat cover 50 fully functions as a partition wall that separates the seat mounting frame 60 or 160 from the lower space. Even when the seat cushion 36 of the bench seat 35 is flipped up, the seat cover 50 prevents the seat support frame 40 from being exposed in the vehicle interior S.

As described above, the utility vehicle 10 according to the present embodiment includes the seat 31, 131, or 231 arranged in the vehicle interior S, the seat mounting frame 60 or 160 to which the seat 31, 131, or 231 is mounted, the vehicle body frame 1 to which the seat mounting frame 60 or 160 is mounted, and the seat cover 50 that is arranged below the seat 31, 131, or 231, and defines the lower side of the vehicle interior S and covers the seat 31, 131, or 231 from below.

The seat mounting frame 60 or 160 and the vehicle body frame 1 are arranged above and below the seat cover 50 and are mounted with the seat cover 50 interposed therebetween. The seat 31, 131, or 231 of one of the multiple seat types is mounted to the vehicle body frame 1 via the seat mounting frame 60 or 160 above the seat cover 50 common to the multiple seat types.

As a result, the seat 31, 131, or 231 is mounted to the common vehicle body frame 1 and seat cover 50 via the seat mounting frame 60 or 160 different for each seat. As a result, it is not necessary to assemble the vehicle body frame and the seat cover for each seat, and the productivity can be improved. In addition, the number of parts can be reduced by sharing the vehicle body frame 1 and the seat cover 50. Therefore, the seats 31, 131, and 231 of the multiple seat types can be mounted with high productivity. Further, by preparing the seat mounting frame 60 or 160, it is possible to reduce the through holes formed in the seat cover 50 required for mounting the seat 31, 131, or 231. By reducing the through holes in this way, it is possible to prevent foreign matter from entering the vehicle interior S through the through holes.

Further, the seat 31, 131, or 231 of one of the bench seat type, the separate seat type, and the composite type in which the bench seat and the separate seat are combined is mounted to the vehicle body frame 1. As a result, the seat 31, 131, or 231 of the bench seat type, the separate seat type, or the composite type can be mounted to the vehicle body frame 1 with high productivity while suppressing foreign matter from entering the vehicle interior S from below the seat.

Further, the seat mounting frame 160 for the bench seat type and the separate seat type or the seat mounting frame 60 for the composite type is mounted to the vehicle body frame 1 depending on the seat type of the seat. As a result, for the bench seat type seat 131 and the separate seat type seat 231, the common first seat mounting frame 160 is used. Further, for the composite type seat 31, the second seat mounting frame 60 different from the first seat mounting frame 160 is used. In this way, since the common seat mounting frame 160 is used for the bench seat type and the separate seat type, the number of parts and assembly man-hours are reduced as compared to the case where the seat mounting frame dedicated to each seat type is used, so that the productivity can be improved.

Further, the floor panel 27 that defines the lower side of the vehicle interior S together with the seat cover 50 is arranged on the front side of the vehicle body of the seat cover 50, the seat cover 50 includes the upper surface portion 51 that is arranged below the seat 31 and extends in the front-rear direction, and the front surface portion 52 that extends downward from the front side of the upper surface portion 51 and is connected to the floor panel 27, and the recessed portion 54 that is recessed downward from the upper surface portion 51 and recessed rearward from the front surface portion 52 is formed on one side of the seat cover 50 in the vehicle width direction. As a result, since the recessed portion 54 that is recessed downward from the upper surface portion 51 and recessed rearward from the front surface portion 52 is formed on one side of the seat cover 50 in the vehicle width direction, a storage space for storing luggage or the like can be formed by the recessed portion 54 in the lower part of the seat 31 on one side in the vehicle width direction.

Further, the seat 31 includes the first seat 35 for an occupant excluding a driver, which is arranged on one side in the vehicle width direction, and the second seat 32 for a driver, which is arranged on the other side in the vehicle width direction, and the first seat 35 is configured so that the seat portion can be arranged in the seating position and the flip-up position. As a result, when the seat 31 including the first seat 35 for an assistant and the second seat 32 for a driver is mounted, the first seat 35 can be arranged in the flip-up position when the occupant is not seated on the first seat 35 to provide a storage space.

Further, the floor panel 27 that defines the lower side of the vehicle interior S together with the seat cover 50 is arranged on the front side of the vehicle body of the seat cover 50, the seat cover 50 includes the upper surface portion 51 that is arranged below the seat 31 and extends in the front-rear direction, and the front surface portion 52 that extends downward from the front side of the upper surface portion 51 and is connected to the floor panel 27, and the recessed portion 54 that is recessed downward from the upper surface portion 51 and recessed rearward from the front surface portion 52 is formed in the lower part of the first seat 35 in the seat cover 50. As a result, the first seat 35 can be arranged in the flip-up position to open the upper part of the recessed portion 54 formed in the seat cover 50, and the storage space can be increased. In addition, the recessed portion 54 provided below the first seat 35 can be accessed from above, making it easier to load and unload an object housed in the recessed portion 54.

Further, the seat cover 50 is made of resin. As a result, the seat cover 50 can be formed with better moldability and reduced in weight as compared with the case where the seat cover 50 is made of metal.

Further, the recessed portion 54 includes the outer wall portion 54c on the outer side in the vehicle width direction which forms the recessed portion 54, and the inner wall portion 54b on the inner side in the vehicle width direction which forms the recessed portion 54, and the front end portion of the outer wall portion 54c is located behind the front end portion of the inner wall portion 54b. As a result, as compared with the case where the front end portion of the outer wall portion 54c of the recessed portion 54 is not located behind the front end portion of the inner wall portion 54b of the recessed portion 54, access to the recessed portion 54 forming the storage space from the door side arranged outside the vehicle interior S in the vehicle width direction can be made easier.

Further, a support portion 163 that supports the seat 31 from below is stretched over the outer wall portion 54c and the inner wall portion 54b of the recessed portion 54 so as to extend in the vehicle width direction. As a result, since the support portion 163 that supports the seat 31 from below is stretched over the outer wall portion 54c and the inner wall portion 54b of the recessed portion 54 so as to extend in the vehicle width direction, even when the recessed portion 54 is formed in the seat cover 50, the load acting on the seat 31 arranged above the recessed portion 54 can be transmitted to the outer wall portion 54c and the inner wall portion 54b of the recessed portion 54 by the support portion 163.

Further, the support portion 163 constitutes a part of the seat mounting frame 160. As a result, the load acting on the seat 31 arranged above the recessed portion 54 can be transmitted from the seat mounting frame 160 to the vehicle body frame 1.

Further, the seat mounting frame 60 or 160 is removably mounted to the vehicle body frame 1. As a result, even after the utility vehicle 10 is manufactured, the seat mounting frames 60 and 160 can be replaced according to the user's preference, and the seats 31, 131, and 231 with different seat types can be mounted. The seat arrangement can be changed after purchase of the utility vehicle 10.

Further, the seat 31, 131, or 231 includes the seat inner frame 31a, 131a, or 231a that is arranged inside the seat 31, 131, or 231 and forms the skeleton of the seat 31, 131, or 231, and the seat inner frame 31a, 131a, or 231a is supported by the seat mounting frame 60 or 160. As a result, since the load acting on the seat 31, 131, or 231 is transmitted from the seat inner frame 31a, 131a, or 231a to the vehicle body frame 1 through the seat mounting frame 60 or 160, even when the seat type of the seat is different, the load from the seat mounting frame 60 or 160 can be transmitted to the vehicle body frame 1 while the variation in the state of transmission of the load to the vehicle body frame 1 which is input from the seat mounting frame 60 or 160 is suppressed. The seat can be mounted to the seat mounting frame so that the mounting position differs for each seat according to the mounting position and mounting structure of the seat inner frame, whereas the seat mounting frame can be mounted to the vehicle body frame 1 with the mounting position kept constant even when the seat is different. As a result, even when the seat, specifically the seat inner frame is different, the load can be transmitted from the seat mounting frame to the vehicle body frame 1 while the variation in the transmission of the load transmitted from the seat mounting frame to the vehicle body frame 1 is suppressed. As a result, it is not necessary to set design conditions different for each seat type for the vehicle body frame 1.

Further, the seat cover 50 is formed with the through holes 55d and 55e through which the connecting portions B1 for connecting the seat mounting frame 60 or 160 and the vehicle body frame 1 penetrate, and the seat cover 50 is interposed in the portion between the seat mounting frame 60 or 160 and the vehicle body frame 1 excluding the connecting portions B1. As a result, even when the seat mounting frame 60 or 160 and the vehicle body frame 1 are mounted with the seat cover 50 interposed therebetween, the seat cover 50 is interposed in the portion between the seat mounting frame 60 or 160 and the vehicle body frame 1 excluding the connecting portions B1, so that it is possible to suppress the inflow and outflow of air between the inside of the vehicle interior S and the lower part of the seat cover 50.

Further, the utility vehicle 10 includes the roof cover 28 that covers the upper side of the vehicle interior S. As a result, since the roof cover 28 that covers the upper side of the vehicle interior S is provided, the occupant in the vehicle interior S can be protected from water and fine particles falling from above such as rainfall and falling sand. In the utility vehicle 10, the partition wall that separates the indoor space from the outdoor space to prevent outside air from entering during traveling is provided. Therefore, it is possible to prevent outside air from entering the indoor space by the partition wall as well as reducing the through holes formed in the seat cover 50.

Further, the utility vehicle 10 includes the air conditioner 11. As a result, air conditioning in the vehicle interior S can be performed, and comfort in the vehicle interior can be improved. By reducing the through holes formed in the seat cover 50, it is possible to prevent the outside air from entering the vehicle interior S and the inside air from exiting to the outside of the vehicle interior S, thereby enhancing the air conditioning effect.

The utility vehicle 10 may include an air conditioner having a heating function excluding a cooling function. Further, the utility vehicle 10 may not include an air conditioner. Even in this case, by reducing the through holes formed in the seat cover 50, it is possible to prevent the outside air from entering the vehicle interior S.

The utility vehicle 10 may not include partition walls such as the left and right doors 26, the door windows, and the roof cover 28 that separate both sides in the vehicle width direction and the upper side of the vehicle interior S. Even in such a case, by providing the seat cover 50 in the utility vehicle 10, it is possible to suppress the ingress of water from below the seat into the vehicle interior S when the utility vehicle 10 travels under the state where the wheels are submerged in water.

In the present embodiment, the seat mounting frame 60 or 160 is removably mounted to the vehicle body frame 1, but the seat mounting frame 60 or 160 may be fixedly mounted to the vehicle body frame 1, for example, by welding or the like. Further, although the slide mechanisms 70 is mounted to the seat mounting frame 60 or 160 and the first cross frame 43, it may be mounted only to the seat mounting frame 60 or 160 arranged above the seat cover 50.

In the present embodiment, only the first row seat is provided as the seat, but a second row seat may be provided behind the first row seat. The present invention is also applicable to the second row seat.

The present invention is not limited to the illustrated embodiment, and various improvements and design changes can be made without departing from the gist of the present invention.

What is claimed is:

1. A utility vehicle comprising:
   a seat arranged in a vehicle interior;
   a seat mounting frame to which the seat is mounted;
   a vehicle body frame to which the seat mounting frame is mounted; and
   a seat cover that is arranged below the seat, and defines a lower side of the vehicle interior and covers the seat from below,
   wherein the seat mounting frame and the vehicle body frame are arranged above and below the seat cover and mounted with the seat cover interposed therebetween, and
   wherein the seat of one of multiple seat types is mounted to the vehicle body frame via the seat mounting frame above the seat cover common to the multiple seat types.

2. The utility vehicle according to claim 1, wherein the seat of one of a bench seat type, a separate seat type, and a composite type in which a bench seat and a separate seat are combined is mounted to the vehicle body frame.

3. The utility vehicle according to claim 2, wherein the seat mounting frame for the bench seat type and the separate seat type or the seat mounting frame for the composite type is mounted to the vehicle body frame depending on the seat type of the seat.

4. The utility vehicle according to claim 1, wherein
   a floor panel that defines the lower side of the vehicle interior together with the seat cover is arranged on a front side of a vehicle body of the seat cover,
   wherein the seat cover includes an upper surface portion that is arranged below the seat and extends in a front-rear direction, and a front surface portion that extends downward from a front side of the upper surface portion and is connected to the floor panel, and wherein a recessed portion that is recessed downward from the upper surface portion and recessed rearward from the front surface portion is formed on one side of the seat cover in a vehicle width direction.

5. The utility vehicle according to claim 1, wherein the seat includes a first seat for an occupant excluding a driver, which is arranged on one side in a vehicle width direction, and a second seat for a driver, which is arranged on the other side in the vehicle width direction, and wherein the first seat is configured so that a seat portion can be arranged in a seating position and a flip-up position.

6. The utility vehicle according to claim 5, wherein a floor panel that defines the lower side of the vehicle interior together with the seat cover is arranged on a front side of a vehicle body of the seat cover, wherein the seat cover includes an upper surface portion that is arranged below the seat and extends in a front-rear direction, and a front surface portion that extends downward from a front side of the upper surface portion and is connected to the floor panel, and wherein a recessed portion that is recessed downward from the upper surface portion and recessed rearward from the front surface portion is formed in a lower part of the first seat in the seat cover.

7. The utility vehicle according to claim 1, wherein the seat cover is made of resin.

8. The utility vehicle according to claim 4, wherein the recessed portion includes an outer wall portion on an outer side in the vehicle width direction which forms the recessed portion, and an inner wall portion on an inner side in the vehicle width direction which forms the recessed portion, and wherein a front end portion of the outer wall portion is located behind a front end portion of the inner wall portion.

9. The utility vehicle according to claim 8, wherein a support portion that supports the seat from below is stretched over the outer wall portion and the inner wall portion of the recessed portion so as to extend in the vehicle width direction.

10. The utility vehicle according to claim 9, wherein the support portion constitutes a part of the seat mounting frame.

11. The utility vehicle according to claim 1, wherein the seat mounting frame is removably mounted to the vehicle body frame.

12. The utility vehicle according to claim 1, wherein the seat includes a seat inner frame that is arranged inside the seat to form a skeleton of the seat, and wherein the seat inner frame is supported by the seat mounting frame.

13. The utility vehicle according to claim 1, wherein the seat cover is formed with a through hole through which a connecting portion for connecting the seat mounting frame and the vehicle body frame penetrates, and wherein the seat cover is interposed in a portion between the seat mounting frame and the vehicle body frame excluding the connecting portion.

14. The utility vehicle according to claim 13, further comprising a roof cover that covers an upper side of the vehicle interior.

15. The utility vehicle according to claim 14, further comprising an air conditioner.

16. A utility vehicle comprising:

a seat arranged in a vehicle interior;

a seat mounting frame to which the seat is mounted;

a vehicle body frame to which the seat mounting frame is mounted; and a seat cover that is arranged below the seat, and defines a lower side of the vehicle interior and covers the seat from below.

17. A manufacturing method for a utility vehicle comprising:

assembling a vehicle body frame common to multiple seat types;

mounting a seat cover common to the multiple seat types that defines a lower side of a vehicle interior above the vehicle body frame;

preparing a seat mounting frame according to one of the multiple seat types;

mounting the seat mounting frame above the seat cover; and mounting a seat of the one of the multiple seat types to the seat mounting frame.

* * * * *